United States Patent
Kubota et al.

(10) Patent No.: US 10,739,456 B2
(45) Date of Patent: Aug. 11, 2020

(54) DISTANCE MEASURING DEVICE

(71) Applicant: Kabushiki Kaisha Toshiba, Minato-ku, Tokyo (JP)

(72) Inventors: Hiroshi Kubota, Tokyo (JP); Nobu Matsumoto, Ebina Kanagawa (JP); Tomonori Fukushima, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 511 days.

(21) Appl. No.: 15/625,138

(22) Filed: Jun. 16, 2017

(65) Prior Publication Data

US 2017/0363740 A1 Dec. 21, 2017

Related U.S. Application Data

(60) Provisional application No. 62/351,349, filed on Jun. 17, 2016.

(51) Int. Cl.
| | |
|---|---|
| *G01C 3/08* | (2006.01) |
| *G01S 17/10* | (2020.01) |
| *G01S 7/4865* | (2020.01) |
| *G01S 7/484* | (2006.01) |
| *G01S 17/42* | (2006.01) |
| *G01S 7/487* | (2006.01) |
| *G01S 7/4863* | (2020.01) |

(52) U.S. Cl.
CPC ............ *G01S 17/10* (2013.01); *G01S 7/484* (2013.01); *G01S 7/487* (2013.01); *G01S 7/4863* (2013.01); *G01S 7/4865* (2013.01); *G01S 17/42* (2013.01)

(58) Field of Classification Search
CPC ........ G01S 17/10; G01S 17/42; G01S 7/4865; G01S 7/487; G01S 7/4863; G01S 7/484
USPC ...................................... 359/5.01
See application file for complete search history.

(56) References Cited

U.S. PATENT DOCUMENTS

| | | | |
|---|---|---|---|
| 7,460,062 B2 | 12/2008 | Nakamura | |
| 2003/0218919 A1 | 11/2003 | Arita et al. | |
| 2006/0232760 A1* | 10/2006 | Asbrock | G01S 7/483 356/4.03 |
| 2013/0107243 A1* | 5/2013 | Ludwig | G01C 3/08 356/5.01 |
| 2013/0250273 A1* | 9/2013 | Ludwig | G01S 17/10 356/4.07 |
| 2015/0285623 A1* | 10/2015 | Tachibana | G01B 11/14 250/341.8 |

(Continued)

FOREIGN PATENT DOCUMENTS

JP   2010-237067 A   10/2010

*Primary Examiner* — Mark Hellner
(74) *Attorney, Agent, or Firm* — White & Case LLP

(57) ABSTRACT

According to an embodiment, a distance measuring device includes emission circuitry, an optical mechanism system, and measurement circuitry. The emission circuitry emits pulse light having a predetermined pulse width. The optical mechanism system emits the pulse light emitted by the emission circuitry to an object to be measured and receives scattered light of the pulse light scattered by the object to be measured. The measurement circuitry measures, via the optical mechanism system, a distance to the object to be measured using a detection signal having magnitude corresponding to light intensity received within a time range corresponding to the pulse width.

19 Claims, 31 Drawing Sheets

(56) References Cited

U.S. PATENT DOCUMENTS

2017/0082746 A1  3/2017  Kubota et al.
2017/0234972 A1  8/2017  Takizawa

* cited by examiner

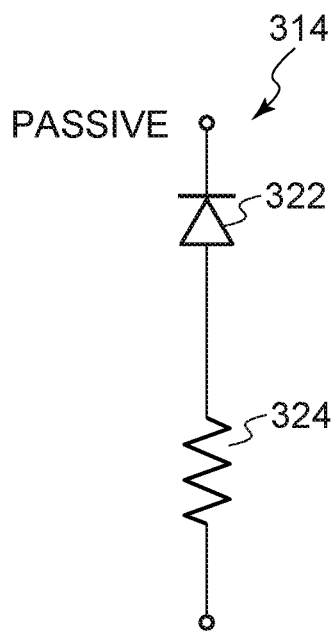
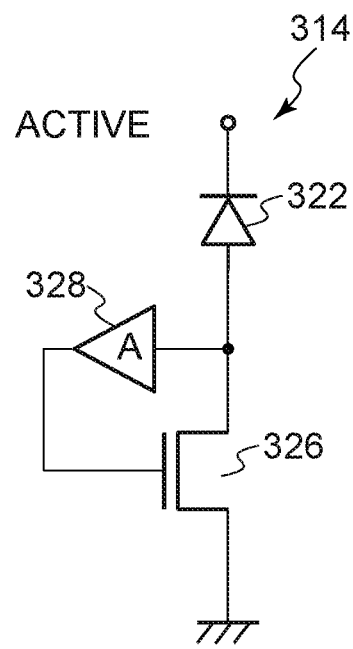
FIG. 7A
FIG. 7C
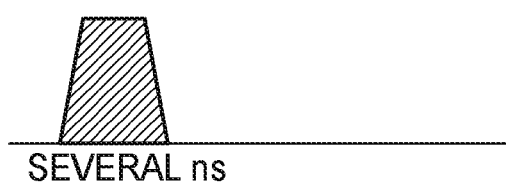
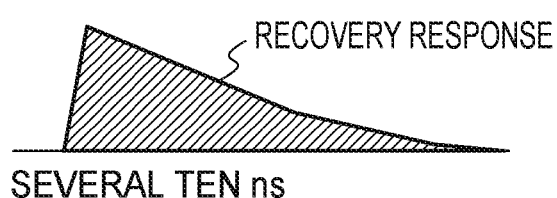
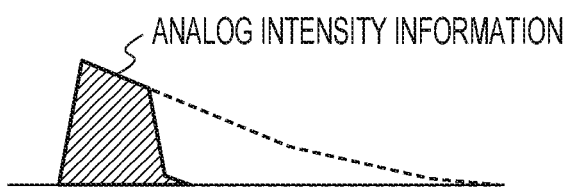
FIG. 7B
FIG. 7D

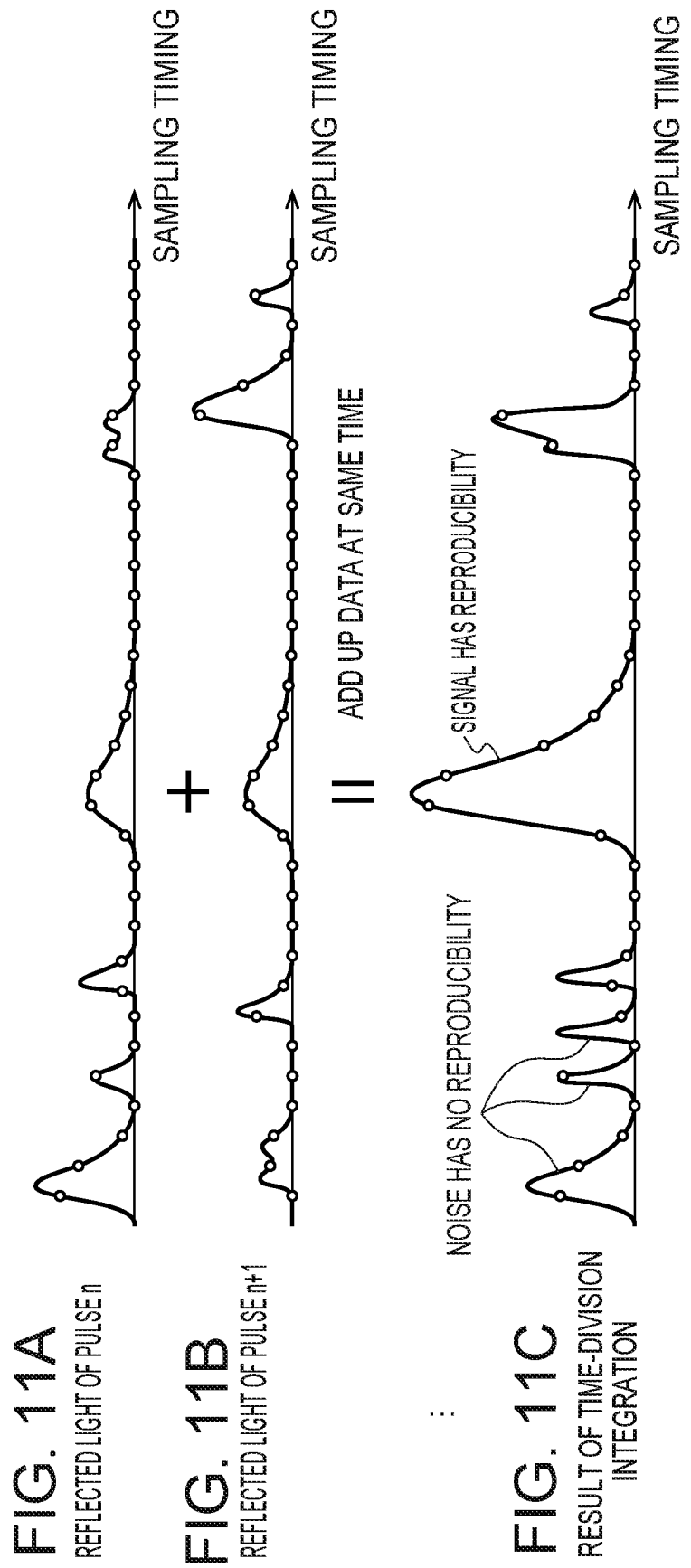

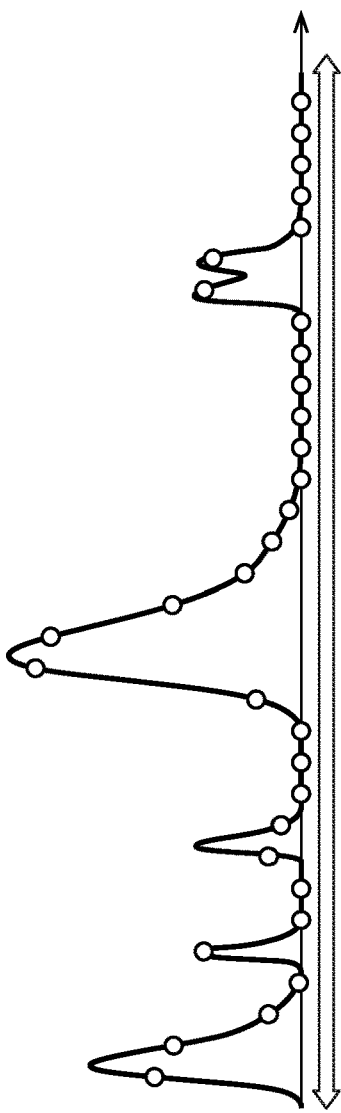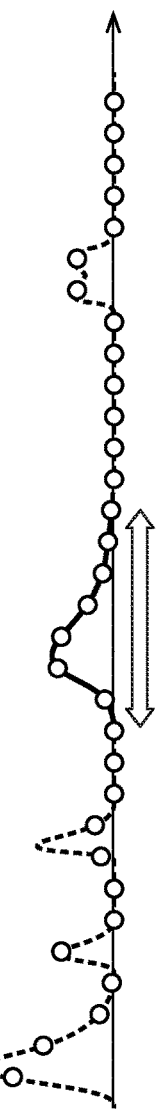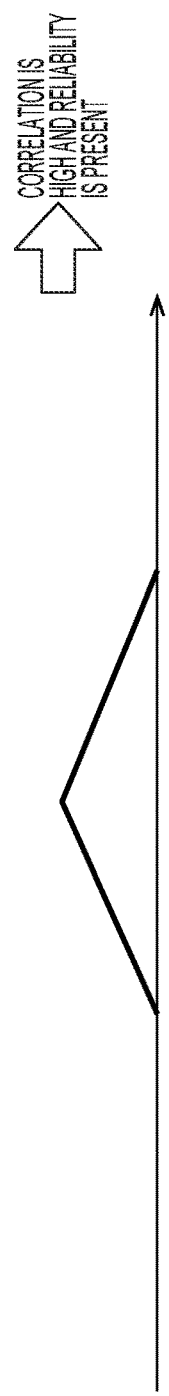
FIG. 25A AVERAGED PEAK SIGNAL
FIG. 25B UNAVERAGED PEAK SIGNAL
FIG. 25C CROSS-CORRELATION

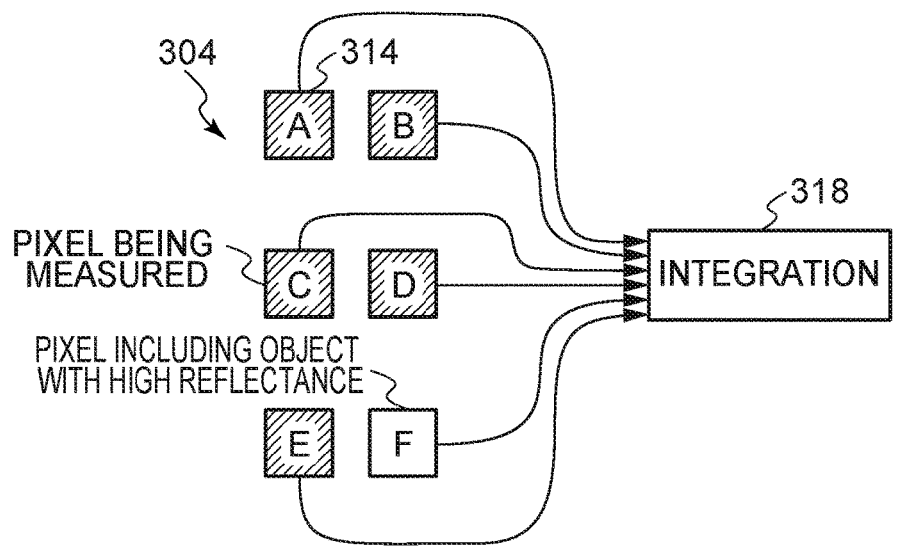
FIG. 31
FIG. 32A
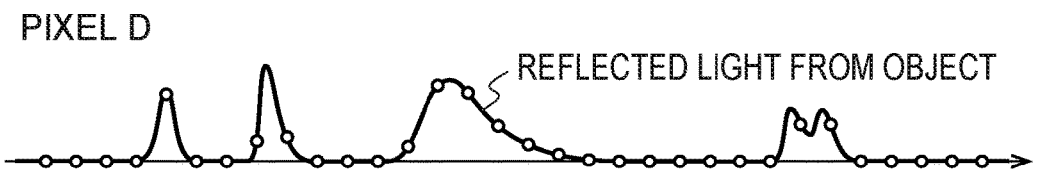
FIG. 32B
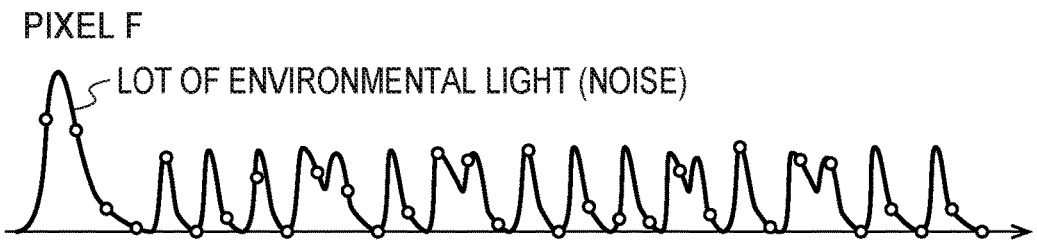
FIG. 32C
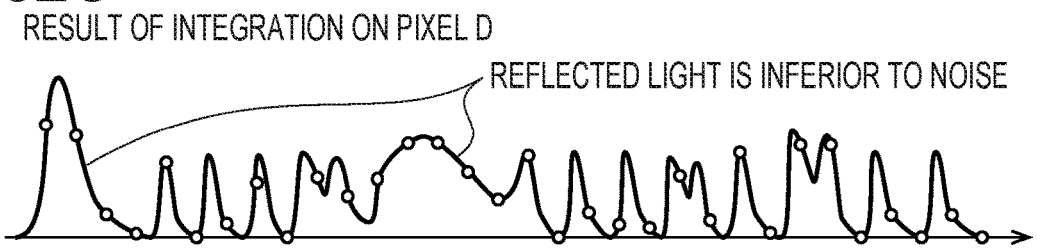

PIXEL F

RESULT OF INTEGRATION ON PIXEL D

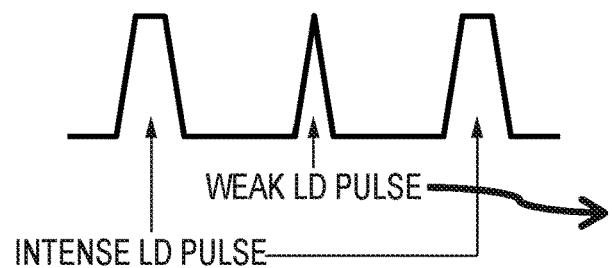
FIG. 36
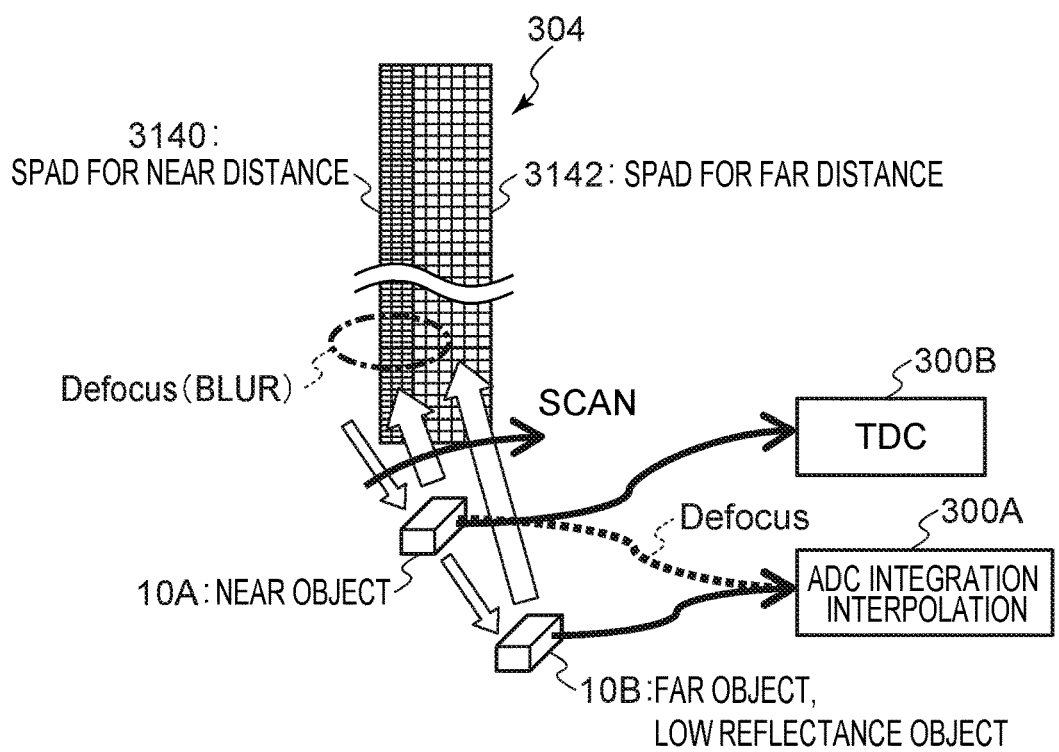
FIG. 37
| DISTANCE, ETC. | LD PULSE | MEASUREMENT SCHEME |
|---|---|---|
| NEAR DISTANCE | SMALL | TDC |
| INTERMEDIATE DISTANCE | SMALL | ADC INTEGRATION INTERPOLATION |
| FAR DISTANCE OR LOW REFLECTANCE | LARGE | ADC INTEGRATION INTERPOLATION |
FIG. 38

DISTANCE MEASURING DEVICE

CROSS REFERENCE TO RELATED APPLICATIONS

This application is based upon and claims the benefit of priority from the prior U.S. Provisional Patent Application No. 62/351,349, filed on Jun. 17, 2016, the entire contents of which are incorporated herein by reference.

FIELD

Embodiments described herein relate generally to a distance measuring device.

BACKGROUND

There is known a distance measuring device called LIDAR (Light Detection and Ranging, Laser Imaging Detection and Ranging). In this device, an object to be measured is irradiated with pulse light from a light source and scattered light scattered by the object to be measured is detected by a photodetector. A turnaround time of light is longer as a distance from the distance measuring device to the object to be measure, that is, an optical path length is longer. Therefore, the distance can be measured using a time difference between timing when the light source emits the light and timing when the scattered light is detected.

A pulse width, which is a continuous radiation time of the pulse light emitted from the light source, is decided in advance. However, when the photodetector detects the scattered light for a time period longer than a time period corresponding to the pulse width, it is likely that the detection is more strongly affected by environmental light.

BRIEF DESCRIPTION OF THE DRAWINGS

FIGS. 7A to 7D are diagrams showing the configuration of light receiving cells of a passive type and an active type;

FIGS. 11A to 11C are diagrams showing a state of time division integration in time-division integration circuitry;

FIGS. 25A to 25C are diagrams showing an example of a cross-correlation;

FIG. 31 is a diagram schematically showing the reflectance of a measurement target object that reflects photons returning to light receiving elements (pixels);

FIGS. 32A to 32C are diagrams schematically showing integrated outputs of the light receiving elements D;

FIG. 36 is a diagram schematically showing a time-series pulse of a light source;

FIG. 37 is a diagram schematically showing the configuration of a light detector; and FIG. 38 is a diagram showing a table showing intensities and measurement schemes of lights emitted by light sources used in measurement at a near distance, an intermediate distance, and a far distance or low reflectance.

DETAILED DESCRIPTION

According to an embodiment, a distance measuring device includes emission circuitry, an optical mechanism system, and measurement circuitry. The emission circuitry emits pulse light having a predetermined pulse width. The optical mechanism system emits the pulse light emitted by the emission circuitry to an object to be measured and receives scattered light of the pulse light scattered by the object to be measured. The measurement circuitry measures, via the optical mechanism system, a distance to the object to be measured using a detection signal having magnitude corresponding to light intensity received within a time range corresponding to the pulse width.

Hereinafter, embodiments of the present invention will be described with reference to the drawings. The embodiments do not limit the present invention.

First Embodiment

A distance measuring device according to a first embodiment measures a distance to an object to be measured using a detection signal within a time period corresponding to a pulse width of pulse light emitted by emission circuitry to thereby reduce the influence of environmental light and improve measurement accuracy. The distance measuring device is explained below more in detail.

Figure 1:
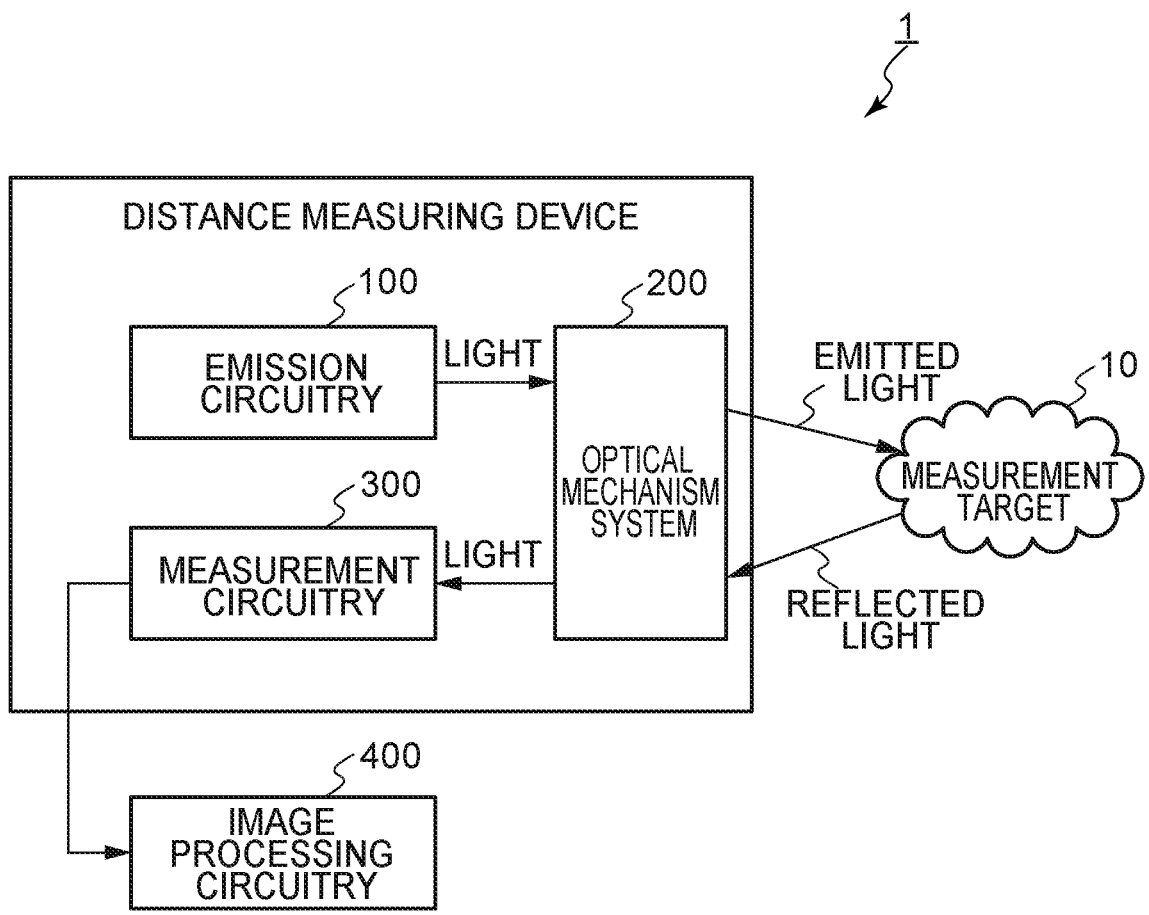
FIG. 1 is a diagram showing a schematic overall configuration of a distance measuring device according to a first embodiment.

First, components of a distance measuring device 1 are explained with reference to FIG. 1. FIG. 1 is a diagram showing a schematic overall configuration of the distance measuring device 1 according to the first embodiment. As shown in FIG. 1, the distance measuring device 1 calculates a distance to a measurement target 10 on the basis of a time period until scattered light returns from the measurement target 10 which is irradiated with the light. More specifically, the distance measuring device 1 includes emission circuitry 100, an optical mechanism system 200, measurement circuitry 300, and image processing circuitry 400.

The emission circuitry 100 emits pulse light having a predetermined pulse width. The emission circuitry 100 includes, for example, a light source that emits laser. The emission circuitry 100 intermittently emits the pulse light.

The optical mechanism system 200 emits the pulse light emitted by the emission circuitry 100 to the measurement target 10 and receives scattered light returning from a predetermined direction in scattered light of the pulse light scattered by the object to be measured 10. More specifically, the optical mechanism system 200 causes the pulse light emitted by the emission circuitry 100 to scan on the measurement target and makes the scattered light of the light scattered by the measurement target incident on the measurement circuitry 300. Note that the measurement target 10 is sometimes referred to as object to be measured 10 below. The pulse light is sometimes referred to as emitted light. The scattered light is sometimes referred to as reflected light.

The measurement circuitry 300 measures a distance to the measurement target 10 on the basis of a time period in which light emitted by the emission circuitry 100 is reflected on the measurement target 10 and returns via the optical mechanism system 200. More specifically, the measurement circuitry 300 measures, via the optical mechanism system 200, the distance to the object to be measured 10 on the basis of a detection signal having magnitude corresponding to the intensity of received scattered light.

The image processing circuitry 400 performs noise removal, distortion correction, and interpolation processing and outputs a final distance image data. The image processing circuitry 400 is sometimes incorporated in a housing of the distance measuring device 1.

Figure 2:
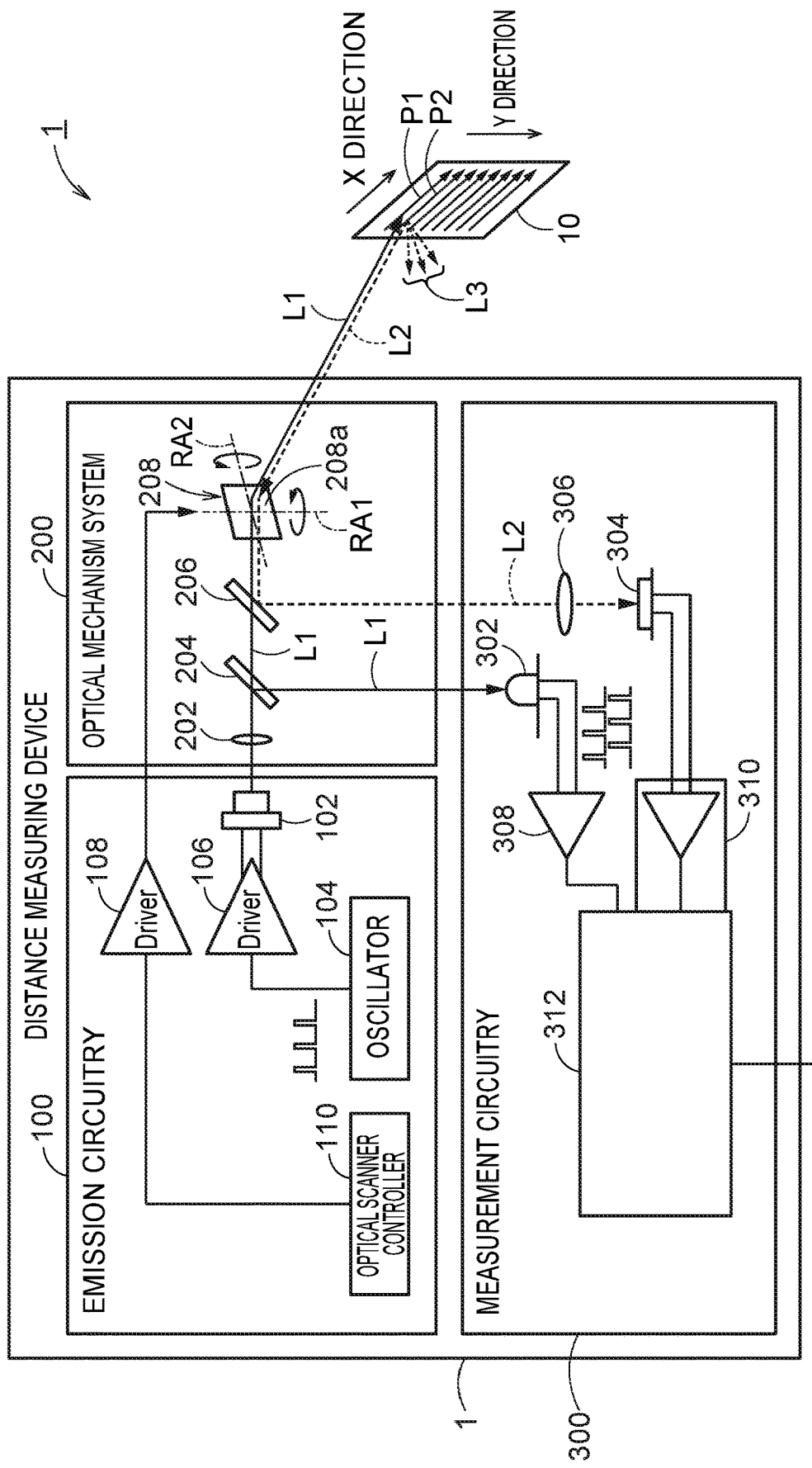
FIG. 2 is a diagram showing a configuration example of the distance measuring device according to the first embodiment.

An example of more detailed configurations of the emission circuitry 100, the optical mechanism system 200, and the measurement circuitry 300 is explained with reference to FIG. 2. FIG. 2 is a diagram showing a configuration example of the distance measuring device 1 according to the first embodiment.

As shown in FIG. 2, the distance measuring device 1 generates a distance image of the object to be measured 10 using a scanning scheme and a TOF (Time Of Flight) scheme. That is, the distance measuring device 1 intermittently emits light L1 to the object to be measured 10 and measures a distance to the object to be measured 10 on the basis of a time period from the emission of the light L1 until scattered light L2 of the light L1 scattered by the object to be measured 10 is detected.

As explained above, the distance measuring device 1 includes the emission circuitry 100, the optical mechanism system 200, the measurement circuitry 300, and the image processing circuitry 400. The emission circuitry 100 includes a light source 102, an oscillator 104, driving circuitry 106 and driving circuitry 108, and scanning control circuitry (an optical scanner controller) 110.

The optical mechanism system 200 includes a lens 202, optical elements 204 and 206, and a reflection device (a movable mirror) 208. The measurement circuitry 300 includes photodetectors 302 and 304, a lens 306, an amplifier 308, an analog circuitry section 310, and a measurement circuitry 300. An object of the optical element 204 and the movable mirror 208 is to scan light as explained below.

Note that, as an existing method for scanning light, there is a method of rotating the light source 102, the lens 202, the photodetectors 302 and 304, and the lens 306 besides the movable mirror 208 (hereinafter referred to as rotating method). As another existing method for scanning light, there is an optical phased array (hereinafter referred to as OPA method). Since this embodiment does not depend on a method of scanning light, the rotating method and the OPA can also be applied instead of the method of the movable mirror.

The oscillator 104 of the emission circuitry 100 generates a pulse signal. The driving circuitry 106 drives the light source 102 on the basis of the pulse signal. The light source 102 is a laser light source such as a laser diode. The light source 102 intermittently emits the light L1 according to driving by the driving circuitry 106. That is, the light L1 is pulse light.

The scanning control circuitry 110 performs control for continuously changing an inclination angle of a reflection surface 208a. The driving circuitry 108 drives the reflection device 208 according to a driving signal supplied from the scanning control circuitry 110.

The lens 202, the optical elements 204 and 206, and the reflection device 208 of the optical mechanism system 200 are provided in this order on an optical path of the light L1 emitted from the light source 102.

The lens 202 collimates the light L1 and guides the light L1 to the optical element 204.

The optical element 204 is provided between the lens 202 and the optical element 206. The optical element 204 transmits light L1 and makes a part of the light L1 incident on the photodetector 302. The optical element 204 may be, for example, a splitter.

The optical element 206 is provided between the optical element 204 and the reflection device 208. The optical element 206 transmits the light L1 transmitted through the optical element 204 and makes the light L1 incident on the reflection device 208.

The reflection device 208 includes the reflection surface (a mirror surface) 208a that reflects the light L1 emitted from the light source 102. The reflection surface 208a changes a reflecting direction of the light L1, causes the reflected light L1 to scan on the object to be measured 10, and reflects scattered light L2 of the light L1 scattered by the object to be measured 10. The reflection device 208 continuously changes the inclination angle of the reflection surface 208a and changes the reflecting direction of the light L1 according to a driving signal supplied from the scanning control circuitry 110 via the driving circuitry 108. For example, the reflection surface 208a is capable of turning around two turning axes RA1 and RA2 crossing each other.

The reflection surface 208a causes the light L1 to scan in the horizontal direction in order while shifting the light L1 in the vertical direction along a plurality of substantially parallel linear paths on the object to be measured 10. That is, the light L1 scans a linear path P1 in an x direction (the horizontal direction) and subsequently scans, in the x direction, a linear path P2 shifted in a y direction (the vertical direction). The light L1 repeats the scanning and pulse light is radiated on the linear paths. Note that the number of linear paths and a scanning direction are not particularly limited.

The light L1 with which the object to be measured 10 is irradiated is scattered by the object to be measured 10. The light L1 scattered by the object to be measured 10 (hereinafter, scattered light L2) travels in a direction opposite to the direction of the light L1 on an optical path substantially the same as the optical path of the light L1. The scattered light L2 is a photon. The scattered light L2 reflected on the reflection surface 208a is made incident on the optical element 204.

Note that, in FIG. 2, the optical paths of the light L1 and the scattered light L2 are separately shown for clarification. However, actually, the optical paths of the light L1 and the scattered light L2 substantially overlap. An optical path in the center of a light beam of the light L1 and an optical path in the center of a light beam made incident on the reflection surface 208a of the scattered light L2 are shown. Scattered light L3 traveling on optical paths other than the optical path of the light beam of the scattered light L2 is not made incident on the photodetector 304.

The optical element 206 changes the traveling direction of the scattered light L2 reflected on the reflection surface 208a. The lens 306 of the measurement circuitry 300 condenses the scattered light L2 and makes the scattered light L2 incident on the photodetector 304. The optical element 206 may be, for example, a half mirror or a mirror having a hole.

The photodetector 304 detects the scattered light L2 reflected on the reflection surface 208a and made incident from the lens 306. The analog circuitry section 310 is, for example, an amplifier. The analog circuitry section 310 amplifies an output signal of the photodetector 304 and performs band-pass filter processing.

On the other hand, the photodetector 302 detects the light L1 made incident from the optical element 204. The amplifier 308 amplifies an output signal of the photodetector 302 and performs the band-pass filter processing.

The digital circuitry section 312 receives output signals of the amplifiers 308 and 310 and measures, on the basis of detection results of the photodetectors 302 and 304, a distance (an optical path difference) from the reflection surface 208a to a position on the object to be measured 10 irradiated by the light L1. Specifically, the digital circuitry section 312 measures the distance using a time difference between timing when the photodetector 302 detects the light L1 and timing when the photodetector 304 detects the scattered light L2. That is, the distance is longer as the time difference is longer.

Figure 3:
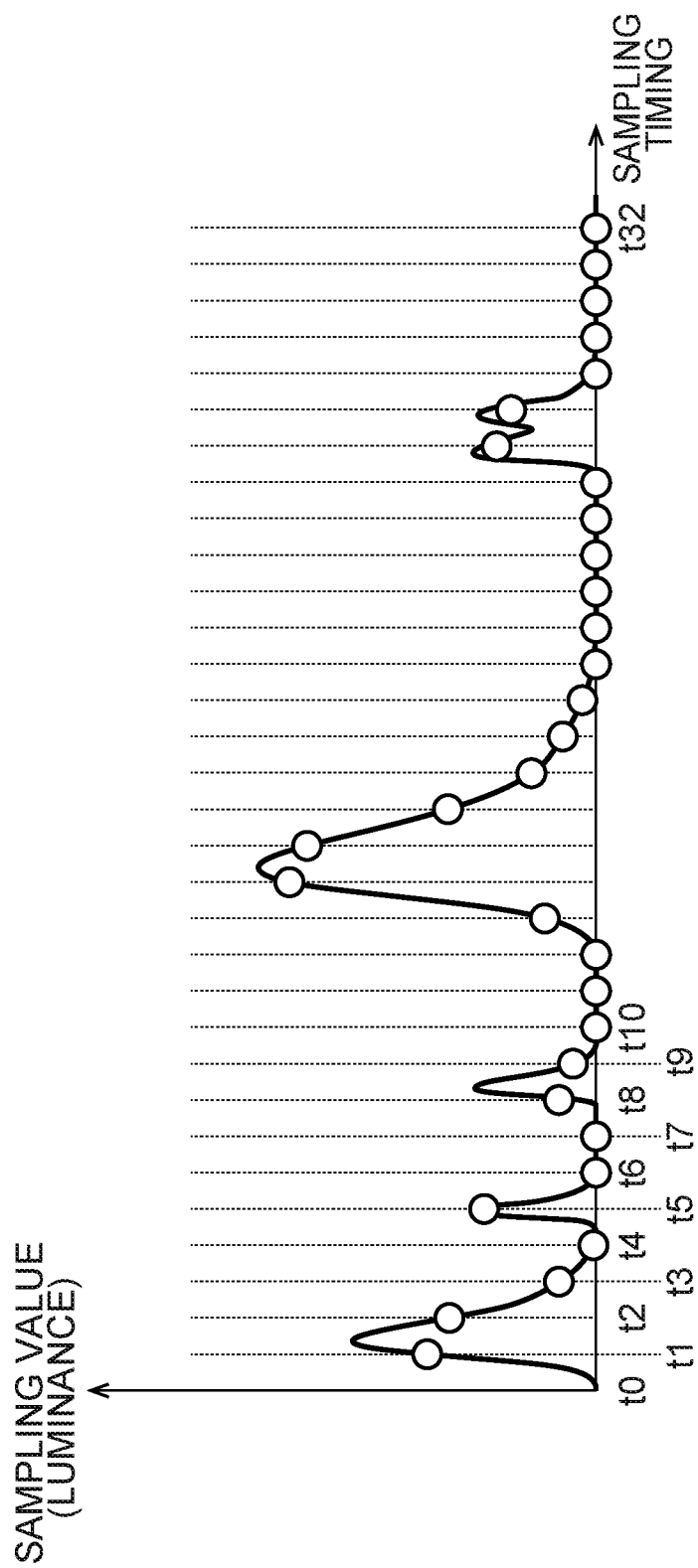
FIG. 3 is a diagram showing an example of a sampling value of an output signal of a photodetector.

FIG. 3 is a diagram showing an example of a sampling value of an output signal of the photodetector 304. The horizontal axis of FIG. 3 represents sampling timing and the vertical axis represents a sampling value (luminance). The sampling timing corresponds to a distance. That is, the measurement circuitry 300 calculates the distance according to an equation [the distance=2×light velocity×(sampling timing−timing when the photodetector 302 detects the light L1)]. The number of sampling timings shown in the figure is an example and is not particularly limited. Note that, in FIG. 3, an analog value and a sampling value at sampling time are simplified and described to coincide with each other. However, usually, since the analog value is converted after being charged in a capacitor (integrated concerning a certain time period), the analog value and the sampling value do not precisely coincide with each other.

Figure 4:
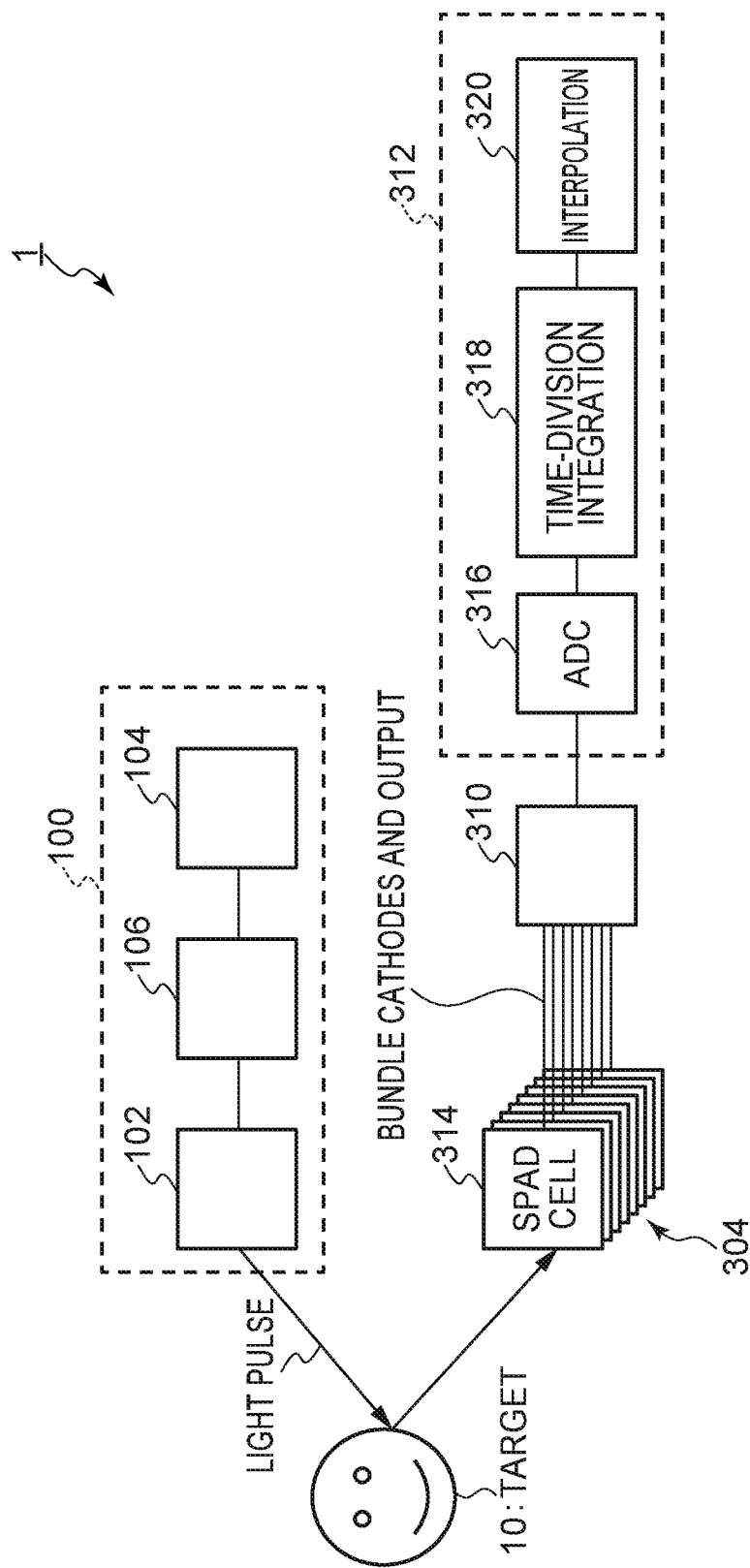
FIG. 4 is a diagram showing a schematic configuration of the distance measuring device including SPAD cells.

A more detailed configuration of the measurement circuitry 300 of the distance measuring device 1 is explained with reference to FIG. 4. FIG. 4 is a diagram showing a schematic configuration of the distance measuring device 1 including SPAD cells 314. To simplify the drawing, the optical mechanism system 200 is omitted.

As shown in FIG. 4, the photodetector 304 outputs an output signal corresponding to the intensity of light received via the optical mechanism system 200. The photodetector 304 includes a plurality of light receiving elements 314.

The light receiving elements 314 in this embodiment are, for example, SPADs (Single-Photon Avalanche Diodes). The SPADs and electric elements (e.g., resistors, capacitors, and semiconductors) connected to the SPADs are collectively referred to as SPAD cells.

The SPAD cells 314 in this embodiment are cells that use avalanche photodiodes (APDs) in a Geiger mode. In the SPAD cells 314, a large gain exceeding ten thousand times is obtained by Geiger discharge. That is, each of the SPAD cells 314 outputs an output signal corresponding to the intensity of light received via the optical mechanism system 200. The SPAD cells 314 are sometimes referred to as SiPMs (Silicon Photomultipliers) below. A detailed configuration of the plurality of light receiving elements 314 is explained below.

The analog circuitry section 310 amplifies outputs of the respective plurality of light receiving elements 314 included in the photodetector 304. The analog circuitry section 310 is configured by, for example, an analog frontend. A detailed configuration of the analog circuitry section 310 is explained below.

The digital circuitry section 312 measures a distance to a measurement target on the basis of an output signal amplified by the analog circuitry section 310. That is, the digital circuitry section 312 includes AD conversion circuitry 316, time-division integration circuitry 318, and measurement processing circuitry 320.

The AD conversion circuitry (ADC: Analog to Digital Converter) 316 samples, every time a pulse light is emitted from the emission circuitry 100, signals corresponding to output signals of the respective plurality of light receiving elements 314 at a plurality of sampling timings and converts the signals into respective digital detection signals. More specifically, the AD conversion circuitry 316 samples, at the plurality of sampling timings, the output signals of the respective plurality of light receiving elements 314 amplified by the analog circuitry section 310 and converts the output signals into the respective digital detection signals. The AD conversion circuitry 316 converts the output signals amplified by the analog circuitry section 310 into digital detection signals in a time range corresponding to a pulse width of pulse light. The pulse width of the pulse light means a time period in which the pulse light is continuously emitted from the emission circuitry 100. That is, the emission circuitry 100 ends the emission when a time period corresponding to the pulse width elapses from the start of the emission of the pulse light.

The time-division integration circuitry 318 outputs, as an integrated digital detection signal, an integrated value obtained by integrating a plurality of digital detection signals corresponding to the sampling timings of the sampling by the AD conversion circuitry 316. The time-division integration circuitry 318 integrates signals corresponding to the output signals of the respective plurality of light receiving elements 314 and outputs the integrated digital detection signal. More specifically, the time-division integration circuitry 318 outputs, as the integrated digital detection signal, an integrated value of a digital detection signal based on a signal of the light receiving element 314 in a measurement center among the plurality of light receiving elements 314 of the photodetector 304 and respective digital detection signals based on respective outputs of the plurality of light receiving elements 314 disposed within a predetermined range from the light receiving element 314 in the measurement center. Note that, in the integration, an integrated value may be divided by the number of times of integration. Alternatively, in the integration, the integrated value does not have to be divided by the number of times of integration.

The measurement processing circuitry 320 performs interpolation processing of the integrated digital detection signal integrated by the time-division integration circuitry 318 and measures a distance to the measurement target. More specifically, the measurement processing circuitry 320 measures a distance to the object to be measured 10 on the basis of a point in time of a peak in the integrated digital detection signal. A detailed configuration of the measurement processing circuitry 320 is explained below.

Figure 5:
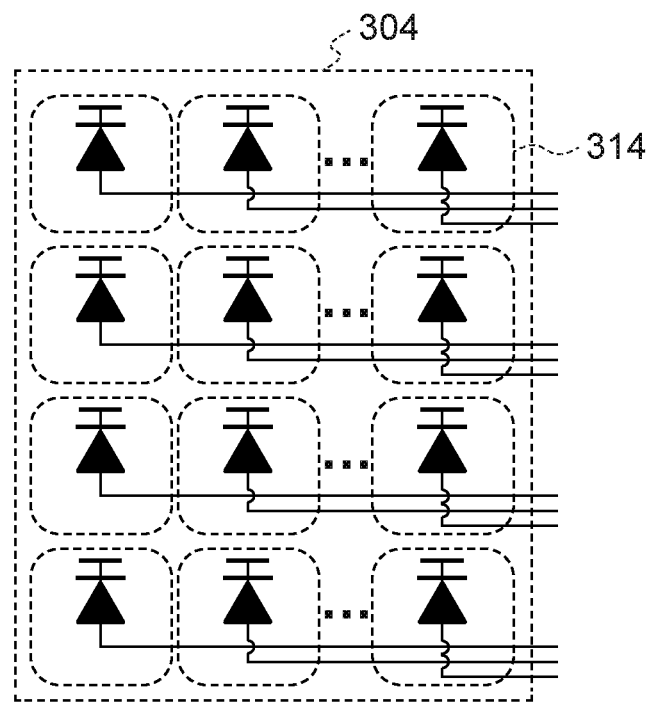
FIG. 5 is a diagram showing a configuration example in which a plurality of light receiving element is arranged in a matrix shape.

A configuration example of the plurality of light receiving elements 314, in which light receiving regions are arranged in a matrix shape, is explained with reference to FIG. 5. FIG. 5 is a diagram showing a configuration example in which the plurality of light receiving elements 314 are arranged in a matrix shape. Six light receiving elements 314 are arrayed per one row. However, the number of the plurality of light receiving elements 314 is not limited to this. Note that the plurality of light receiving elements 314 are the SPADs. Not-shown active quenches are connected to the plurality of light receiving elements 314 in series.

Figure 6:
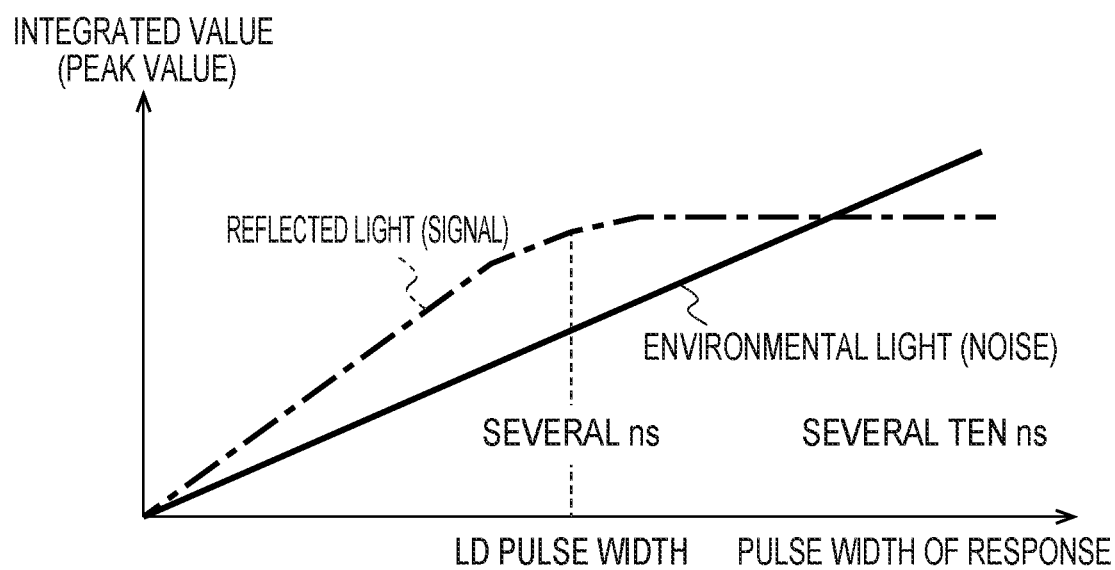
FIG. 6 is a diagram schematically showing a relation between a pulse width (a time period) of a response in the light receiving element and an integrated value of the light receiving element.

FIG. 6 is a diagram schematically showing a relation between a pulse width (a time period) in the light receiving element 314 and an integrated value of the light receiving element 314. The horizontal axis indicates the time period and the vertical axis indicates the integrated value of the light receiving element 314.

When the pulse width of the response in the light receiving element 314 increases, that is, a light reception time increases, an integrated value of reflected light also increases. However, the integrated value starts to be saturated near time corresponding to a pulse width of pulse light emitted by the light source. On the other hand, an integrated value of environmental light monotonously increases according to the pulse width, that is, as the light reception time increases. Therefore, when the pulse width of the response in the light receiving element 314>> the pulse width of the pulse light, the integrated value of the environmental light exceeds the integrated value of the reflected light. Therefore, when the response (several tens ns) of the light receiving element 314 is larger than the pulse width (several ns) of the pulse light, the integrated value of the environmental light is predominant in a value of an output signal. Consequently, the S/N ratio is spoiled and, as a result, it is difficult to detect feeble reflected light.

FIGS. 7A to 7D are diagrams showing the configurations and response characteristics of the light receiving cells 314 of a passive type and an active type. FIG. 7A is a diagram showing the configuration of the light receiving cell 314 of the passive type. As shown in FIG. 7A, in the passive type, a light receiving element 322 and a resistor 324 are connected in series. For example, the light receiving element 322 is an SPAD and the resistor 324 is a quench resistor. The quench resistor drops a voltage applied to the SPAD 322 to a breakdown voltage or less during the Geiger discharge. That is, an electric current flows to the quench resistor during the Geiger discharge, whereby the voltage applied to the SPAD 322 drops to the breakdown voltage or less.

FIG. 7B is a diagram showing a response characteristic of the passive type. A figure on the upper side in FIG. 7B schematically shows pulse light. The horizontal axis indicates time and the vertical axis indicates the intensity of light. In a figure on the lower side, the horizontal axis indicates time and the vertical axis indicates an output current, that is, an output signal of the light receiving element 322. As shown in FIG. 7B, in general, in the light receiving element 322 of the passive type, the output current is gently attenuated. A time period until an end of the attenuation is longer than a pulse width of pulse light. Therefore, it is likely that the integrated value of the environmental light is predominant in a value of the output signal.

On the other hand, FIG. 7C is a diagram showing the configuration of the light receiving cell 314 of the active type. As shown in FIG. 7C, a switching element 326 is connected in series to the light receiving element 322 as an active quench. For example, the plurality of light receiving elements 314 are SPADs. The switching element 326 is, for example, a transistor of a MOS type. One end of the light receiving element 314 is connected to a gate of the transistor via an amplifier 328.

Consequently, the amplifier 328 amplifies a signal according to an output of the output signal and changes the switching element 326 from an ON state to an OFF state, that is, an energized state to an interrupted state. That is, the switching element 326 interrupts an output of the light receiving element 322 according to the elapse of time corresponding to the pulse width from the start of the output of the output signal in the light receiving element 322.

For example, in this embodiment, when an electric current flows to the SPAD 322 during the Geiger discharge, a voltage is applied to the gate of the transistor 326 via the amplifier 328. The transistor 326 interrupts the electric current. In this case, a response of the amplifier 328 is adjusted such that a time period until the transistor 326 interrupts the electric current is equal to or shorter than a pulse width of laser light. In this way, the light receiving element 322 outputs a signal based on light received from a start of emission of the pulse light until the time period corresponding to the pulse width elapses. The time period corresponding to the pulse width means a time period from the start of the emission of the pulse light until the emission of the pulse light ends. That is, the light receiving element 322 outputs a signal based on light received within the time period corresponding to the pulse width.

FIG. 7D is a diagram showing a response characteristic of the light receiving cell 314 of the active type. The horizontal axis indicates time and the vertical axis indicates an output current, that is, an output signal of the light receiving element 322. As shown in FIG. 7D, in the light receiving cell 314 of the active type, compared with the passive type, the output current is steeply attenuated. Therefore, in the light receiving cell 314 of the active type, a time period (a pulse width) until the attenuation ends is equal to or shorter than the pulse width of the pulse light. By using an active quench in this way, it is possible to increase the speed of recovery. The recovery means that the light receiving element 322 returns to a state in which the light receiving element 322 can be used for measurement again. Consequently, it is possible to not only reduce a detection disabled time but also weaken integration of the environmental light. Therefore, it is possible to increase the S/N ratio and improve distance measurement accuracy.

Figure 8:
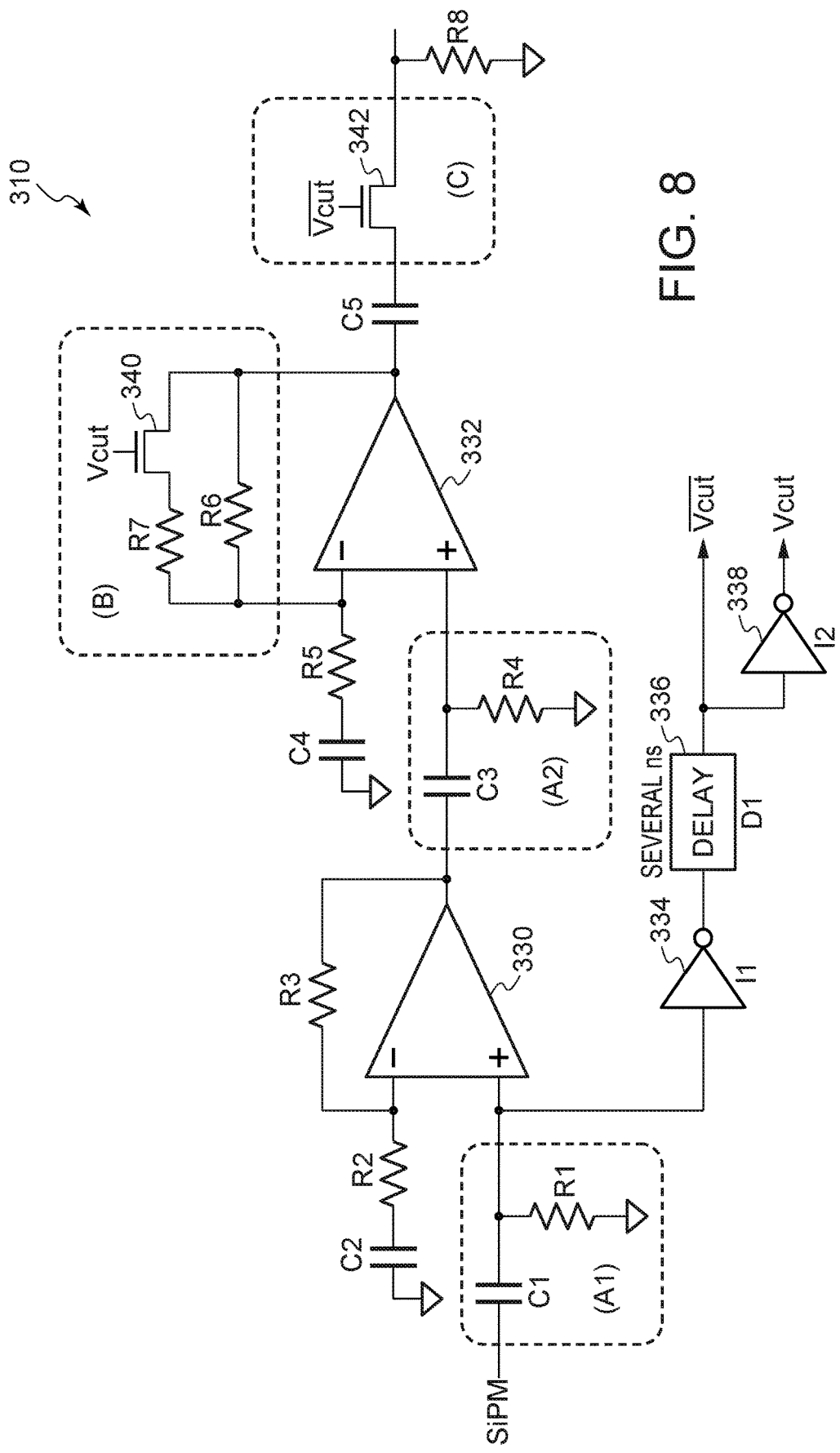
FIG. 8 is a diagram showing a circuitry configuration of an analog circuitry section.

A configuration example of the analog circuitry section 310 is explained with reference to FIG. 8. FIG. 8 is a diagram showing a circuitry configuration of the analog circuitry section 310. As shown in FIG. 8, the analog circuitry section 310 is an analog frontend. The analog circuitry section 310 includes amplification circuitry 330, amplification circuitry 332, a first inverter 334, delay circuitry 336, a second inverter 338, a switching element 340, a switching element 342, capacitors C1 to C5, and resistors R1 to R8. More specifically, an output terminal of the light receiving element 314 (FIG. 4) is connected to a non-inverting input terminal (+) of the amplification circuitry 330 via the capacitor C1. The non-inverting input terminal (+) of the amplification circuitry 330 is grounded via the resistor R1. That is, the capacitor C1 and the resistor R1 configure a filter (A1). The amplification circuitry 330 is, for example, an operational amplifier. The filter is, for example, a high-pass filter. The light receiving element 314 is an SiPM (SPAD).

One end of the first inverter 334 is connected to the non-inverting input terminal (+) of the amplification circuitry 330. The other end of the first inverter 334 is connected to one end of the delay circuitry 336. Further, the other end of the delay circuitry 336 and one end of the second inverter 338 are connected.

An inverting input terminal (−) of the amplification circuitry 330 is grounded via the resistor R2 and the capacitor C2. The resistor R3 is connected between an output terminal of the amplification circuitry 330 and the inverting input terminal (−) of the amplification circuitry 330. That is, a gain of the amplification circuitry is represented by, for example, −R3/R2.

An output of the amplification circuitry 330 is connected to a non-inverting input (+) of the amplification circuitry 332 via the capacitor C3. The non-inverting input (+) of the amplification circuitry 332 is grounded via the resistor R4. That is, the capacitor C3 and the resistor R4 configure a filter (A2). The filter is, for example, a high-pass filter.

An inverting input terminal (−) of the amplification circuitry 332 is grounded via the resistor R5 and the capacitor C4. The resistor R6 is connected between an output terminal of the amplification circuitry 332 and the inverting input terminal (−) of the amplification circuitry 332. Further, the switching element 340 and the resistor R7 are connected in series between the output terminal of the amplification circuitry 332 and the inverting input terminal (−) of the amplification circuitry 332. The switching element 340 is, for example, a transistor of the MOS type. The other end of the second inverter 338 is connected to a gate of the switching element 340. That is, the resistors R6 and R7 and the switching element 340 configure gain change circuitry (B) that actively changes a gain of the amplification circuitry 332.

The switching element 342 is connected to the output terminal of the amplification circuitry 332 via the capacitor C5. The switching element 342 is, for example, a transistor of the MOS type. The other end of the delay circuitry 336 is connected to a gate of the switching element 342. An output terminal of the switching element 342 is grounded via the resistor R8. That is, the switching element 342 configures interruption circuitry (C) that interrupts an output of the amplification circuitry 332.

As shown in (A1) in FIG. 8 referred to above, the analog circuitry section 310 includes at least the filter (A1) that reduces an output signal of the SPAD cell having a frequency equal to or lower than a predetermined frequency and the amplification circuitry 330 that amplifies a signal output by the filter (A1). More specifically, the filter (A1) has a cutoff frequency inversely proportional to a time constant (R1×C1). Consequently, the filter (A1) interrupts an input of an output signal having a frequency equal to or lower than the cutoff frequency to the amplification circuitry 330. The cutoff frequency corresponds to a point in time when a time period corresponding to a pulse width elapses from a start of an output of the output signal in the light receiving element 314. That is, the input of the output signal to the amplification circuitry 330 is interrupted according to the elapse of the time period corresponding to the pulse width from the start of the output of the output signal in the light receiving element 314.

A resistance value of the resistor R1 is adjusted in order to further narrow a pulse width of a signal based on the output signal of the light receiving element 314. For example, the resistance value of the resistor R1 is 47Ω and is adjusted to a value of approximately a half of 100Ω used in a general high-pass filter.

As shown in (A2) in FIG. 8, the analog circuitry section 310 at least includes the filter (A2) that reduces an output signal of the light receiving element 314 having a frequency equal to or lower than a predetermined frequency and the amplification circuitry 332 that amplifies a signal output by the filter. More specifically, the filter (A2) has a cutoff frequency inversely proportional to a time constant (R4×C3). Consequently, the filter (A2) interrupts an input of an output signal having the cutoff frequency or less to the amplification circuitry 332. Therefore, a pulse width of a signal based on the output signal of the light receiving element 314 is further narrowed.

As shown in (B) in FIG. 8, the analog circuitry section 310 includes the amplification circuitry 332 that amplifies an output signal and the gain change circuitry (B) that reduces a gain of the amplification circuitry 332 according to an output of the output signal. More specifically, the gain of the amplification circuitry 332 is changed according to a Vcut (inverted) signal delayed by several nanoseconds from a rising edge of a pulse-like output signal. That is, a gain of the amplification circuitry 332 without an input from the delay circuitry 336 is, for example, −R6/R5. After several nanoseconds from a start of an output of the SPAD cell, for example, the gain is changed to −(R6×R7)/((R6+R7)×R5). The several nanoseconds correspond to a point in time when a time period corresponding to a pulse width elapses from the start of the output of the output signal in the light receiving element 314.

As it is seen from the above, the gain change circuitry (B) attenuates an output pulse of the amplification circuitry 332 after several nanoseconds from the start of the output by the SPAD cell. If a resistance value of the resistor R7> a resistance value of the resistor R6, an attenuation effect is larger. Note that, in this case, a high-speed operational amplifier is necessary. Consequently, the pulse width of the signal based on the output signal of the light receiving element 314 is further narrowed. In this way, the gain change circuitry (B) attenuates the output pulse of the amplification circuitry 332 at the point in time when the time period corresponding to the pulse width elapses from the start of the output by the SPAD cell.

As shown in (C) in FIG. 8, the analog circuitry section 310 includes the amplification circuitry 332 that amplifies an output signal and the second switching element 342 that is connected to the amplification circuitry 332 in series and interrupts an output of the amplification circuitry 332 according to an output of the output signal. More specifically, the analog circuitry section 310 interrupts a signal path of the amplification circuitry 332 with the Vcut signal to thereby narrow a pulse width of the output signal. That is, the switching element 340 changes from the ON state to the OFF state, that is, from the energized state to the interrupted state with the Vcut signal input from the second inverter 338 after several nanoseconds from the start of the output of the light receiving element 314. Consequently, the pulse width of the signal based on the output signal of the light receiving element 314 is further narrowed.

Note that, to narrow the pulse width of the signal based on the output signal of the light receiving element 314, any one of the configurations of (A1), (A2), (B), and (C) shown in FIG. 8 only has to be carried out. Alternatively, any ones of the configurations of (A1), (A2), (B), and (C) shown in FIG. 8 may be carried out in combination.

The reduction of the pulse width in the output signal of the light receiving element 314 in the AD conversion circuitry 316 is explained with reference to FIG. 9. As explained above, the AD conversion circuitry 316 converts the output signal amplified by the analog circuitry section 310 into a digital detection signal in the time range corresponding to the pulse width of the pulse light. More specifically, when sampling the signal corresponding to the output signal of the photodetector 304 at the plurality of sampling timings, the AD conversion circuitry 316 samples the signal in the time range corresponding to the pulse width of the pulse light and converts the signal into the digital detection signal.

Figure 9:
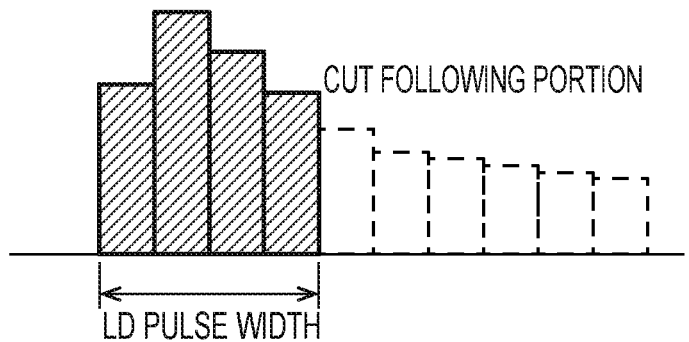
FIG. 9 is a diagram schematically showing a signal digitized by AD conversion circuitry.

FIG. 9 is a diagram schematically showing a signal digitized by the AD conversion circuitry 316. In FIG. 9, the horizontal axis indicates time and the vertical axis indicates an output value of the analog circuitry section 310. As shown in FIG. 9, the AD conversion circuitry 316 sets a value of a digital signal to 0 on the basis of a pulse width of pulse light. That is, in a digital detection signal, the AD conversion circuitry 316 sets a value of a digital detection signal after several nanoseconds from a rising edge of the digital detection signal or a digital detection signal several nanoseconds after a peak position of the digital detection signal to 0 or brings the value of the digital detection signal close to 0.

In this way, the AD conversion circuitry 316 is capable of adjusting, on the basis of the pulse width of the pulse light, the width of the signal based on the output signal of the light receiving element 314. Note that, when the width of the signal based on the output signal of the light receiving element 314 is adjusted, the processing in the AD conversion circuitry 316 and any one of the kinds of processing in (A1), (A2), (B), and (C) (FIG. 8) in the analog circuitry section 310 only have to be carried out. Alternatively, the processing in the AD conversion circuitry 316 and any ones of the kinds of processing in (A1), (A2), (B), and (C) in the analog circuitry section 310 may be carried out in combination.

Figure 10:
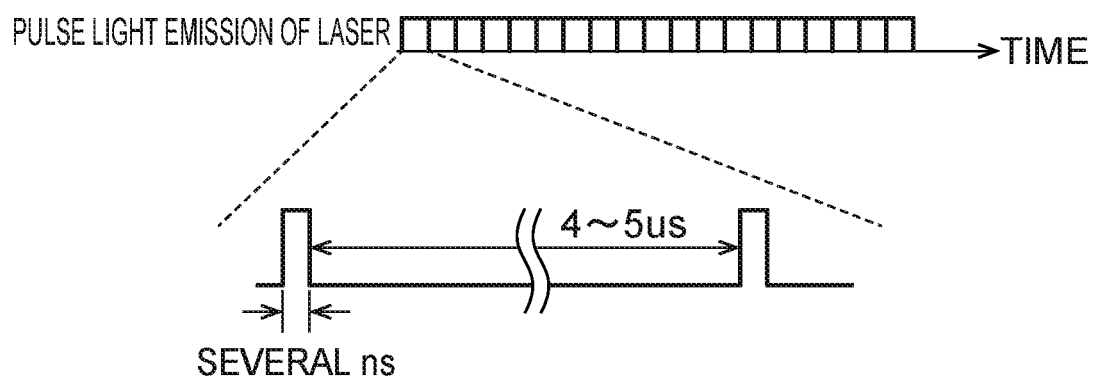
FIG. 10 is a diagram schematically showing an emission pattern of a light source, that is, a pattern of laser pulse light emission.

FIG. 10 is a diagram schematically showing an emission pattern of the light source 102, that is, a pattern of laser pulse light emission. In FIG. 10, the horizontal axis indicates time and the vertical axis indicates emission timing of the light source 102. A figure on the lower side is a partially enlarged view in a figure on the upper side. Light is repeatedly emitted from the light source 102 at an interval of 4 to 5 μs. The light in this case is continuously emitted as pulse light in a period of several nanoseconds.

FIGS. 11A to 11C are diagrams showing a state of time-division integration in the time-division integration circuitry 318. Each of FIGS. 11A and 11B shows values of a digital detection signal sampled at a plurality of sampling timings every time pulse light (n, n+1, . . . ; n is a natural number) is emitted. The horizontal axis indicates the sampling timing and the vertical axis indicates a value (a sampling value) of the digital detection signal.

FIG. 11C shows an integrated digital detection signal obtained by integrating the digital detection signal at each sampling timing. The horizontal axis indicates the sampling timing and the vertical axis indicates a value of the integrated digital detection signal.

In this way, when the time-division integration is performed, signals intensify each other because the signals have reproducibility. On the other hand, since noise is random and does not have reproducibility, the noise does not intensify signals each other. As a result, as the number of times of integration (the number of times of averaging) is increased, a peak of reflected light clearly appears. When the number of times of integration is increased, the S/N ratio is improved.

Figure 12A:
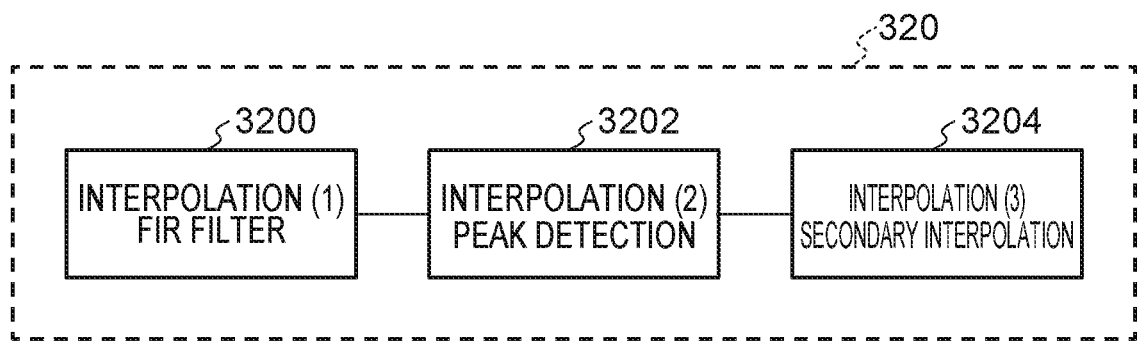
FIG. 12A is a diagram showing the configuration of measurement processing circuitry.
Figure 12B:
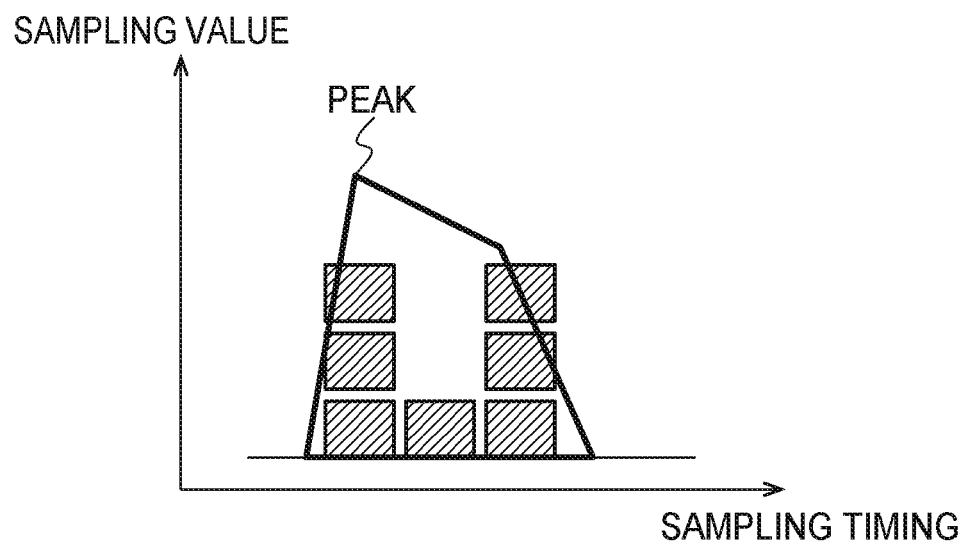
FIG. 12B is a diagram showing a processing result example.

FIGS. 12A and 12B are a diagram showing the configuration of the measurement processing circuitry 320 and a diagram showing a processing result example. FIG. 12A is a diagram showing the configuration of the measurement processing circuitry 320. As shown in FIG. 12A, the measurement processing circuitry 320 includes first interpolation processing circuitry 3200, second interpolation processing circuitry 3202, and third interpolation processing circuitry 3204.

The first interpolation processing circuitry 3200 performs processing using an FIR (Finite Impulse Response) filter. An integrated digital detection signal output by the time-division integration circuitry 318 is supplied to the FIR filter of the first interpolation processing circuitry 3200. The FIR filter outputs output data Df from which noise is removed. When an SiPM (Silicon Photomultiplier) is used, an ideal response waveform at the time when one photon is received is a fixed waveform. Therefore, even when a waveform formed when high-frequency noise is added to the ideal response waveform is input to the FIR filter, it is possible to optimize the FIR filter in advance such that output data close to the ideal response waveform is output.

Consequently, the first interpolation processing circuitry 3200 can determine, by using the FIR filter, whether the integrated digital detection signal fits in the ideal response waveform. Therefore, it is possible to determine that an integrated digital detection signal not fitting in the ideal response waveform is noise or the like and not use the integrated digital detection signal for measurement of a distance.

The second interpolation processing circuitry 3202 detects a peak position of a waveform at the time when time-series data output by the first interpolation processing circuitry 3200 and the ideal response waveform are matched. The third interpolation processing circuitry 3204 performs secondary interpolation of the peak position detected by the second interpolation processing circuitry 3202 and calculates a peak position, that is, a point in time corresponding to the peak position again at resolution finer than the sampling interval. In this case, when the integrated digital detection signal has two peaks, a time interval between which is equal to or smaller than the pulse width of the pulse light, the third interpolation processing circuitry 3204 interpolates a waveform of one peak on the basis of the two peaks and on the basis of the ideal response waveform. Consequently, it is possible to highly accurately detect the peak position. The third interpolation processing circuitry 3204 generates a distance image of the object to be measured 10 on the basis of a distance where the peak position (the point in time) is measured and the inclination angle of the reflection surface 208a.

FIG. 12B is a diagram showing a signal (a solid line) interpolated on the basis of the ideal response waveform. The horizontal axis indicates sampling time and the vertical axis indicates an example of an output value of the first interpolation processing circuitry 3200. A peak shown in FIG. 12B is a peak indicated by the signal interpolated on the basis of the ideal response waveform. In this way, it is possible to calculate the position of the peak at the resolution finer than the sampling interval.

Figure 13:
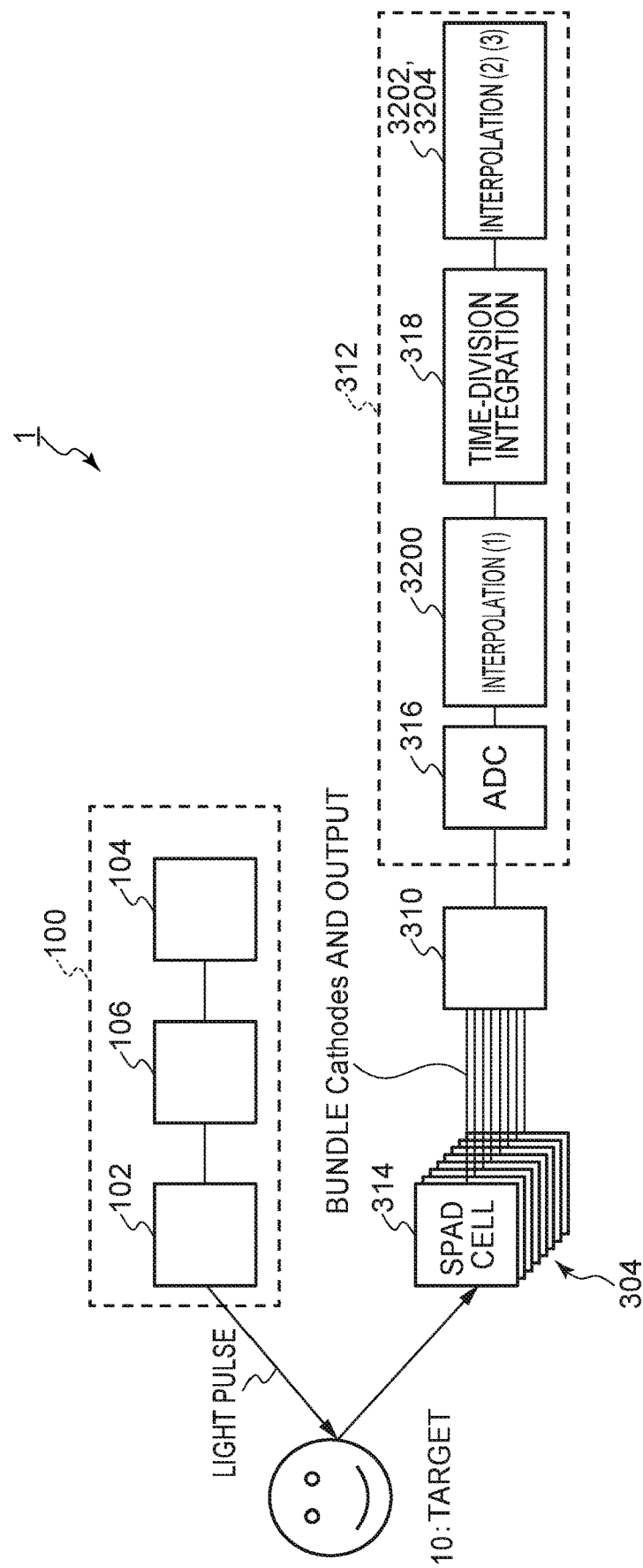
FIG. 13 is a diagram showing a schematic configuration of the distance measuring device 1 that performs processing in first interpolation processing circuitry before processing in the time-division integration circuitry.

The configuration of the measurement circuitry 300 is not limited to the configuration shown in FIG. 4. Besides, the configuration of the measurement circuitry 300 may be a configuration shown in FIG. 13. FIG. 13 is a diagram showing a schematic configuration of the distance measuring device 1 at the time when the processing in the first interpolation processing circuitry 3200 is performed before the processing in the time-division integration circuitry 318. To simplify the drawing, the optical mechanism system 200 is omitted. Components equivalent to the components shown in FIG. 4 are denoted by the same reference numerals and explanation of the components is omitted.

As shown in FIG. 13, the first interpolation processing circuitry 3200 is provided before the time-division integration circuitry 318. That is, the processing in the FIR filter may be performed before the time-division integration because of linearity of the FIR filter. In this case, the processing in the time-division integration circuitry 318 is performed after the processing in the first interpolation processing circuitry 3200 is performed. Subsequently, the processing in the second interpolation processing circuitry 3202 and the processing in the third interpolation processing circuitry 3204 are performed. In embodiments explained below, similarly, the processing in the first interpolation processing circuitry 3200 may be performed before the processing in the time-division integration circuitry 318.

As explained above, with the distance measuring device 1 according to this embodiment, the output signal of the photodetector 304 within the time corresponding to the pulse width of the pulse light emitted by the emission circuitry 100 is used for distance measurement. Consequently, it is possible to reduce the influence of the environmental light and detect feeble scattered light. The measurement circuitry 300 performs the signal processing in a state in which the magnitude of the output signal of the photodetector 304 is maintained. Consequently, intensity information of the scattered light is not lost. It is possible to suppress deterioration in measurement accuracy.

Second Embodiment

The distance measuring device 1 according to a second embodiment is different from the distance measuring device 1 according to the first embodiment in that time to digital conversion circuitry (TDCs: Time to Digital Converters) 346 are used instead of the AD conversion circuitry 316. In the following explanation, differences from the first embodiment are explained. Components same as the components in the first embodiment are denoted by the same reference numerals and explanation of the components is omitted.

Figure 14:
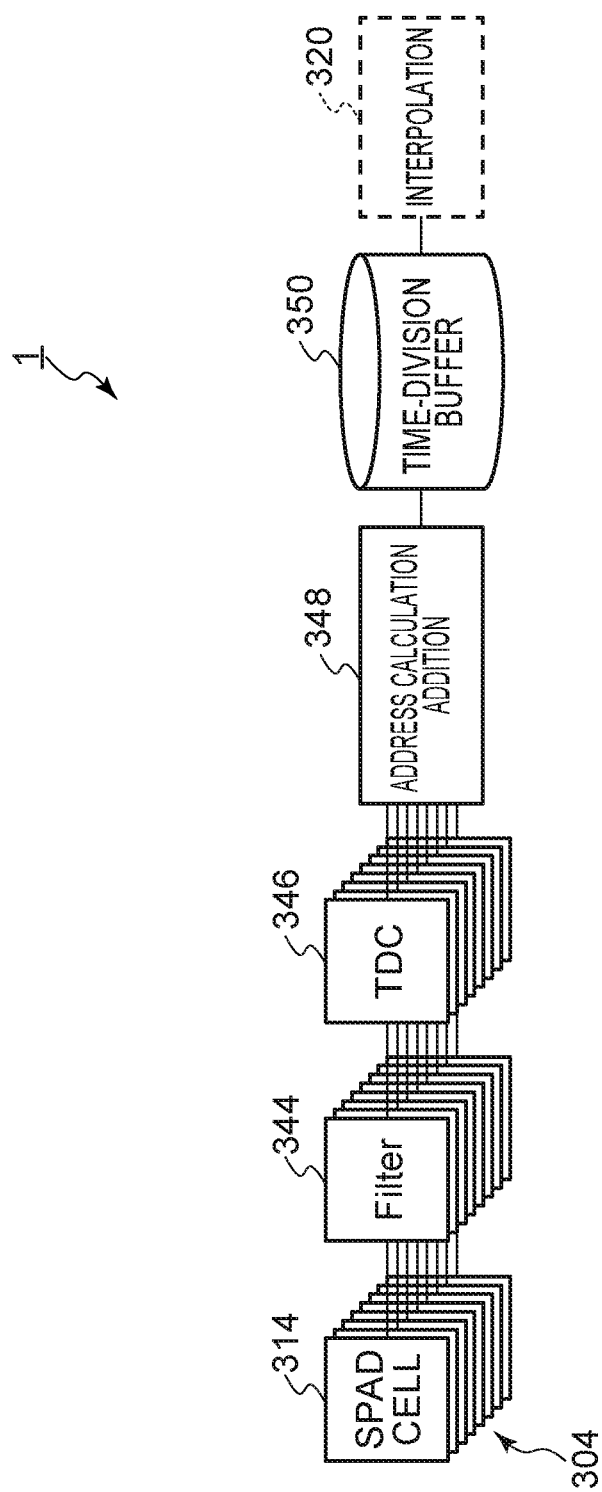
FIG. 14 is a schematic diagram showing a configuration example of the distance measuring device including time to digital conversion circuitry.

The configuration of the distance measuring device 1 according to the second embodiment is explained with reference to FIG. 14. FIG. 14 is a schematic diagram showing a configuration example of the distance measuring device 1 including the time to digital conversion circuitry 346. Emission circuitry and an optical mechanism system are not shown in the figure. As shown in FIG. 14, measurement circuitry of the distance measuring device 1 includes the photodetector 304, a filter 344, the time to digital conversion circuitry 346, address calculation addition circuitry 348, a time-division buffer 350, and the measurement processing circuitry 320.

The filter 344 is, for example, a buffer. The filter 344 shapes a waveform of an output signal output by the photodetector 304 into a waveform of a detection signal having width corresponding to a pulse width of pulse light emitted by a light source and outputs the detection signal. Consequently, it is possible to, while maintaining the intensity of the detection signal, which is an analog signal, to a certain degree, set a response time of the detection signal to time equal to or shorter than the pulse width of the pulse light emitted by the light source. Therefore, it is possible to reduce the influence of the environmental light.

The time to digital conversion circuitry 346 measures a time difference from emission of pulse light until detection of scattered light of light scattered by the object to be measured 10. More specifically, the time to digital conversion circuitry 346 obtains, on the basis of a detection signal output by the filter 344, a time difference between time when the emission circuitry 100 (FIG. 1) emits pulse light and time when scattered light of light scattered by the object to be measured 10 is detected by the photodetector 304. In general, a TDC has temporal resolution higher than the temporal resolution of an ADC. Therefore, it is possible to further increase temporal resolution in distance measurement.

Each of kinds of the time to digital conversion circuitry 346 is connected to the respective plurality of light receiving elements 314. That is, in this embodiment, to the plurality of light receiving elements 314, one kind of time to digital conversion circuitry 346 corresponding to the light receiving elements 314 is connected via the filters 344.

The address calculation addition circuitry 348 adds up the numbers of appearance of measurement results of the time to digital conversion circuitry 346. More specifically, every time the measurement results of the time to digital conversion circuitry 346 are output, the address calculation addition circuitry 348 adds 1 to the buffers corresponding to the measurement results. For example, when a time difference T3, which is a measurement result, is obtained by the time to digital conversion circuitry 346, the address calculation addition circuitry 348 adds 1 to a buffer B[T3]. That is, the address calculation addition circuitry 348 increments the buffer B[T3]. Note that, in this embodiment, the address calculation addition circuitry 348 corresponds to addition circuitry.

The time-division buffer 350 saves buffers in addresses corresponding to results of the time to digital conversion circuitry 346. More specifically, the time-division buffer 350 secures the buffers in the addresses corresponding to the results of the time to digital conversion circuitry 346. For example, when sampling timings are T0 to Tn, the time-division buffer 350 secures buffers B[T0] to B[Tn]. In other words, the address calculation addition circuitry 348 has rough resolution with one photon set as one digit. However, the address calculation addition circuitry 348 converts an analog signal corresponding to a total amount of lights received by the plurality of light receiving elements 314 into time-division digital signals. Note that, since the time to digital conversion circuitry 346 has high temporal resolution, the interpolation processing in the measurement processing circuitry 320 is not always necessary.

Figure 15A:
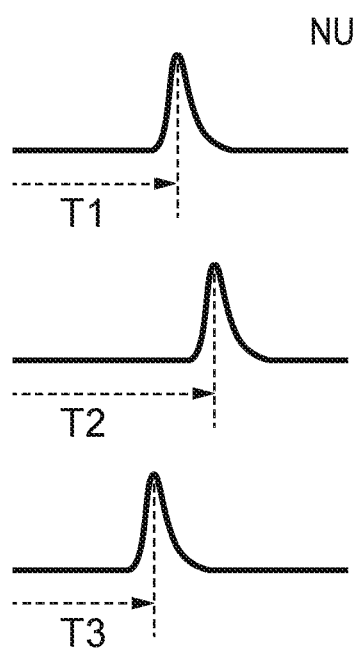
FIGS. 15A and 15B are diagrams showing a state in which address calculation addition circuitry integrates measurement results of the time to digital conversion circuitry.
Figure 15B:
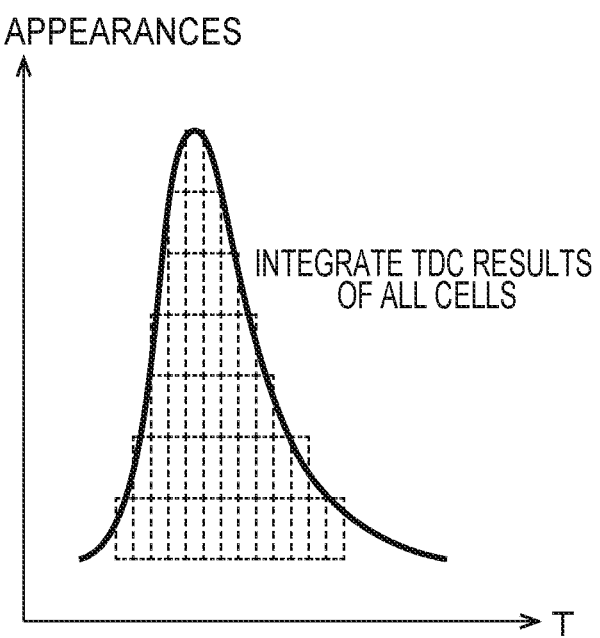

FIGS. 15A and 15B are diagrams showing a state in which the address calculation addition circuitry 348 integrates measurement results of the time to digital conversion circuitry 346. Each of FIGS. 15A and 15B schematically shows a state in which a filter outputs a signal. The horizontal axis indicates a time difference T from a point in time when the emission circuitry 100 (FIG. 2) emits laser, that is, sampling timing and the vertical axis indicates a value of a detection signal output by the filter.

That is, an upper figure in FIG. 15A indicates that a time period from emission of pulse light until scattered light of light scattered by the object to be measured 10 is detected is T1. Similarly, an intermediate figure in FIG. 15A indicates that the time is T2. A lower figure in FIG. 15A indicates that the time is T3. The time to digital conversion circuitry 346 outputs time differences T1, T2, T3, and the like as these measurement times.

FIG. 15B is a diagram schematically showing a state in which the address calculation addition circuitry 348 increments the buffer B[T] corresponding to the time difference T output by the time to digital conversion circuitry 346.

In FIG. 15B, the horizontal axis indicates the time difference T output by the time to digital conversion circuitry 346 and the vertical axis indicates the number of increments of the buffer B[T], that is, the number of appearances of the time difference T. As shown in FIG. 15B, the number of appearances of measurement results of the time to digital conversion circuitry 346 is calculated by the address calculation addition circuitry 348.

Figure 16:
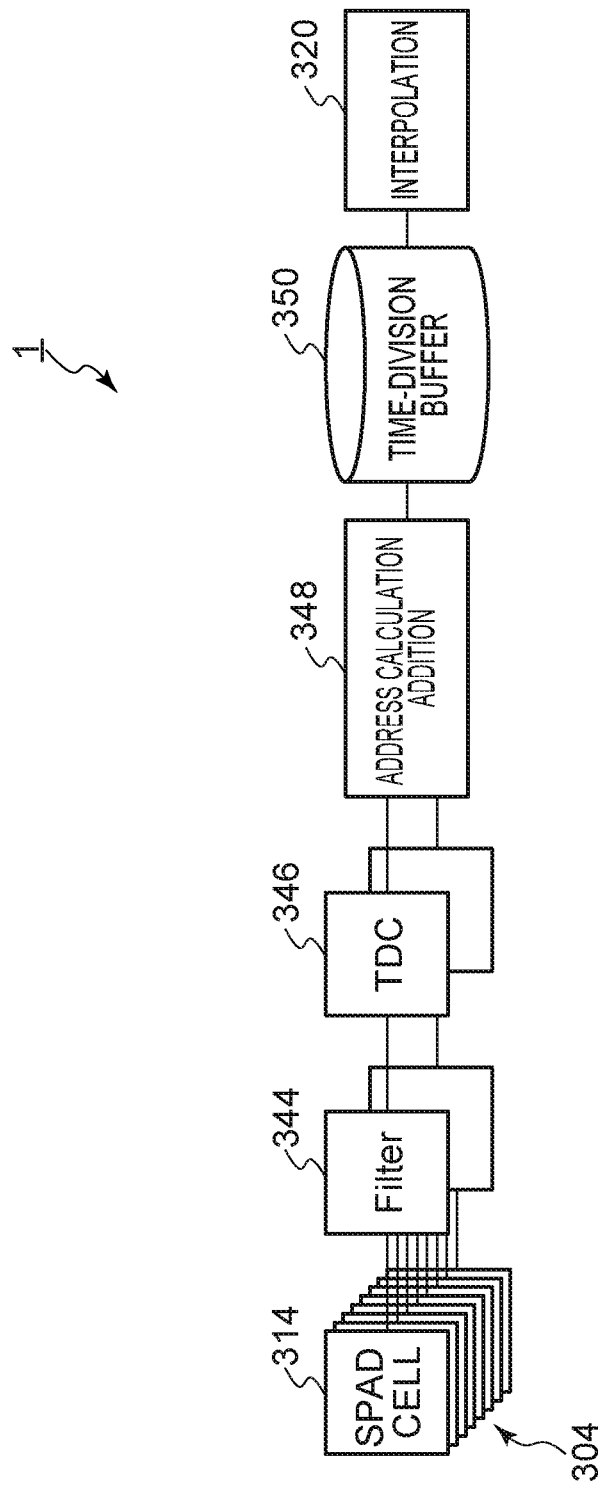
FIG. 16 is a diagram showing a configuration example of the distance measuring device in which the number of kinds of the time to digital conversion circuitry is set smaller than the number of a plurality of light receiving elements.

FIG. 16 is a schematic diagram showing a configuration example of the distance measuring device 1 at the time when the number of the time to digital conversion circuitry 346 is set smaller than the number of the plurality of light receiving elements 314. FIG. 16 is different from FIG. 14 in that one filter and one kind of the time to digital conversion circuitry 346 are connected to the plurality of light receiving elements 314.

Figure 17A:
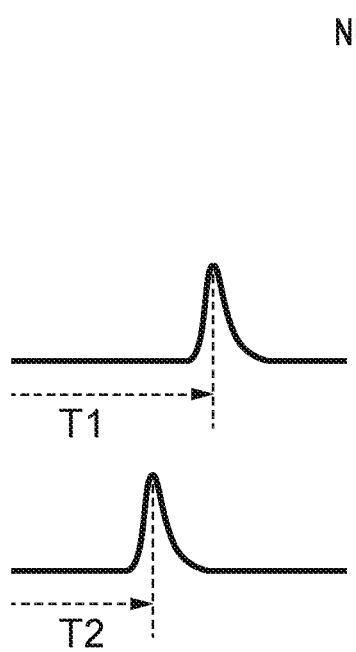
FIGS. 17A and 17B are diagrams showing a state in which measurement results of the time to digital conversion circuitry in the distance measuring device are integrated.
Figure 17B:
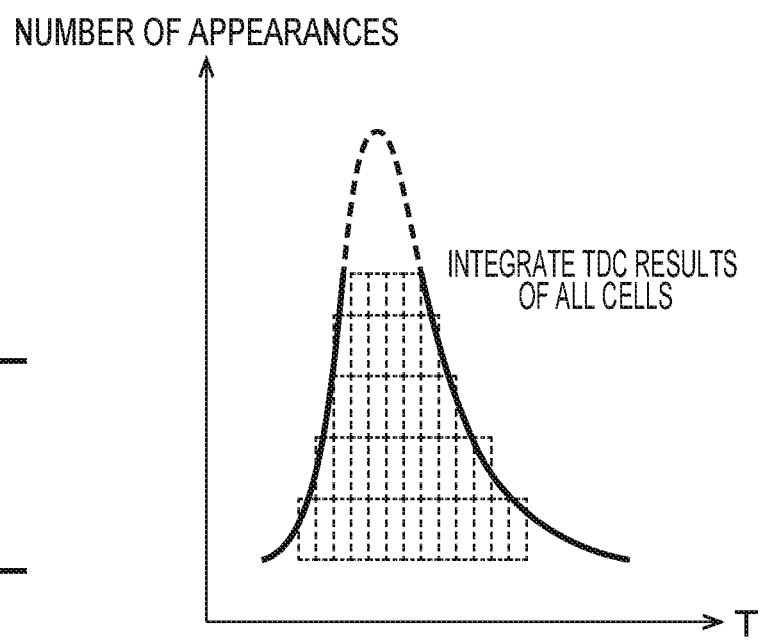

FIGS. 17A and 17B are diagrams showing a state in which measurement results of the time to digital conversion circuitry 346 in the distance measuring device 1 are integrated. FIG. 17A schematically shows a state in which the filter shown in FIG. 16 outputs a signal. The horizontal axis indicates a time period from a point in time when the light source 102 (FIG. 2) emits laser, that is, sampling timing. The vertical axis indicates a value of an output signal of the filter.

FIG. 17B is a diagram schematically showing a state in which the address calculation addition circuitry 348 shown in FIG. 16 increments the buffer B[T] corresponding to the time difference T output by the time to digital conversion circuitry 346.

In FIG. 17B, the horizontal axis indicates the time difference T output by the time to digital conversion circuitry 346. The vertical axis indicates the number of increments of the buffer B[T], that is, the number of appearances of the time difference T.

As shown in FIG. 17B, it is possible to process the light receiving elements 314 larger in number than the time to digital conversion circuitry 346. On the other hand, since the time to digital conversion circuitry 346 is reduced in number, it is likely that the number of appearances of measurement results of the time to digital conversion circuitry 346 decreases. Therefore, in the configuration example of the distance measuring device 1 shown in FIG. 16, it is possible to further improve measurement accuracy by performing interpolation processing in the measurement processing circuitry 320.

As explained above, with the distance measuring device 1 according to this embodiment, the filter 344 shapes a waveform of an output signal output by the photodetector 304 into a waveform of a detection signal having width corresponding to a pulse width of pulse light. Consequently, it is possible to reduce the influence of environmental light and detect feeble scattered light. Since the time to digital conversion circuitry 346 is used, it is possible to further improve temporal resolution in distance measurement.

Third Embodiment

In a third embodiment, after a peak in an integrated digital detection signal obtained by time-division integrating outputs of SPAD cells is detected, the position of the peak is detected again from a digital detection signal in a range based on the peak to maintain temporal resolution and spatial resolution and improve measurement accuracy while reducing the influence of environmental light. Differences from the first embodiment are explained below.

Figure 18:
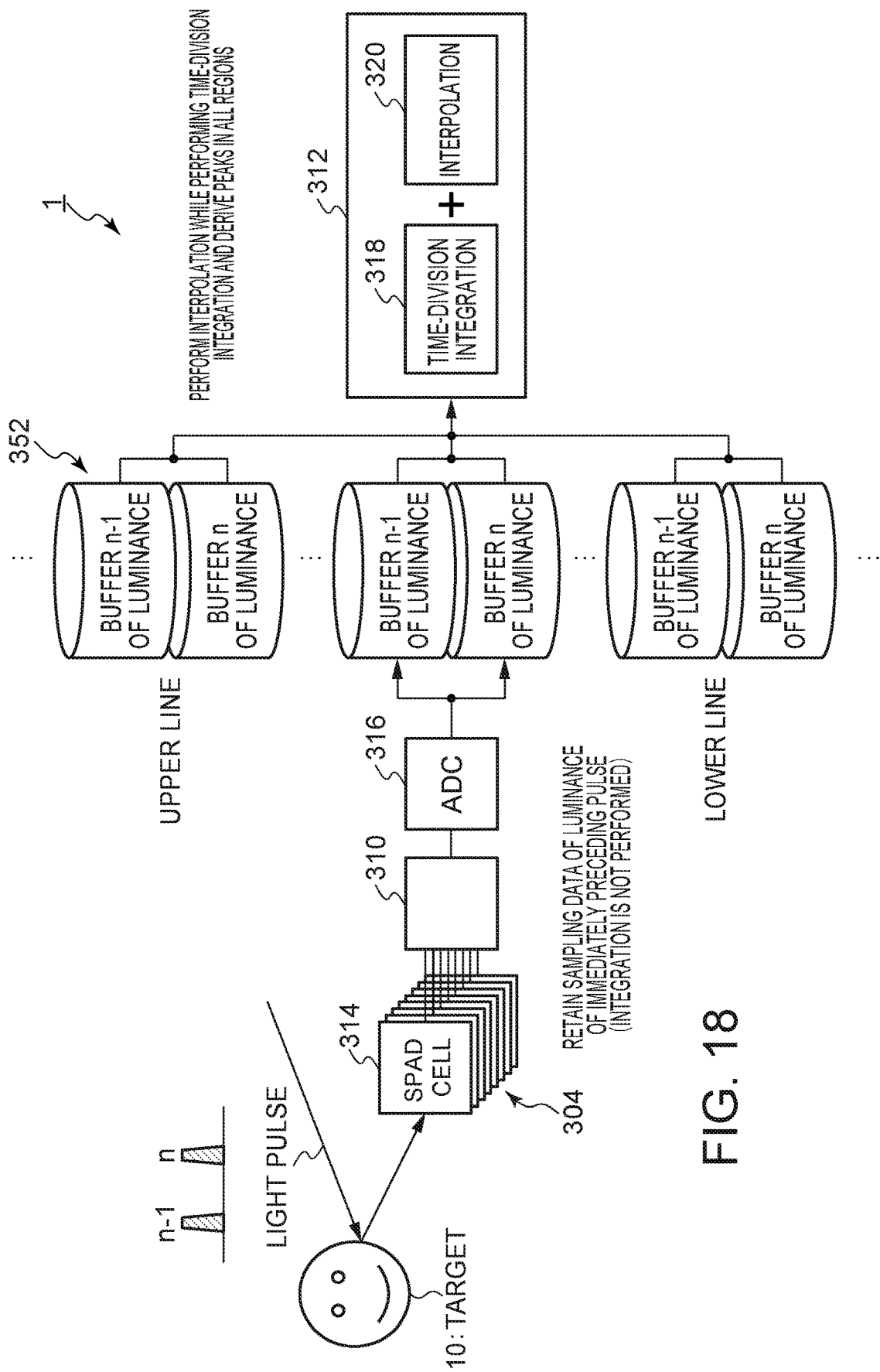
FIG. 18 is a diagram showing a schematic configuration of a distance measuring device according to a third embodiment.

The configuration of the distance measuring device 1 according to the third embodiment is explained with reference to FIG. 18. FIG. 18 is a diagram showing a schematic configuration of the distance measuring device 1 according to the third embodiment. As shown in FIG. 18, the distance measuring device 1 according to the third embodiment is different from the distance measuring device 1 shown in FIG. 4 in that the distance measuring device 1 according to the third embodiment includes a plurality of buffers 352 for each of the plurality of light receiving elements 314. Components same as the components shown in FIG. 4 are denoted by the same reference numerals and explanation of the components is omitted.

The plurality of buffers 352 are capable of retaining a digital detection signal before being time-division integrated. Time-division integration in the time-division integration circuitry 318 is performed after storage in the buffers 352.

Figure 19:
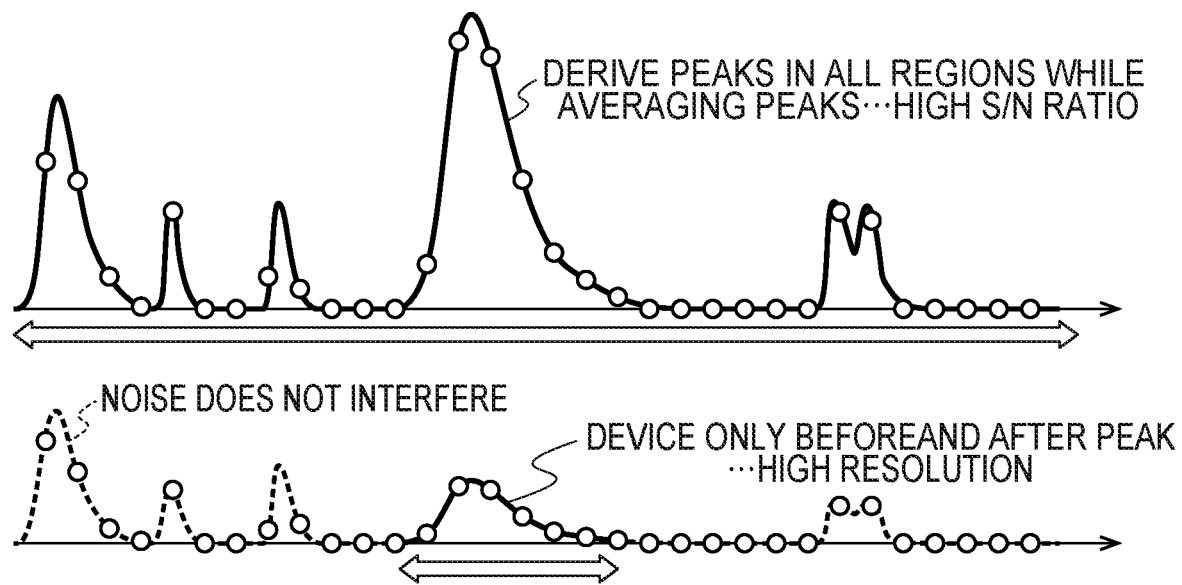
FIG. 19 is a diagram showing an integrated digital detection signal after being time-division integrated and a digital detection signal before being time-division integrated.

FIG. 19 is a diagram showing an integrated digital detection signal after being time-division integrated and a digital detection signal before being time-division integrated. A figure on the upper side shows an integrated digital detection signal. The horizontal axis indicates sampling timing and the vertical axis indicates a value of the integrated digital detection signal. A figure on the lower side shows a digital detection signal. The horizontal axis indicates sampling timing and the vertical axis indicates a value of the digital detection signal.

Like the measurement processing circuitry 320 according to the first embodiment, the measurement processing circuitry 320 performs first-time processing, for example, performs interpolation processing on the integrated digital detection signal shown in the upper figure in FIG. 19 and detects a peak position. For example, the measurement processing circuitry 320 detects two peak positions in a descending order of values of peaks.

Subsequently, the measurement processing circuitry 320 detects a peak position again from a digital detection signal before integration. In this case, on the basis of the peak position calculated in the first-time processing, the measurement processing circuitry 320 uses a digital detection signal in time ranges before and after the peak position. That is, the measurement processing circuitry 320 acquires a digital detection signal before integration, a time range of which is limited on the basis of a first point in time corresponding to the peak position in the integrated digital detection signal. The measurement processing circuitry 320 measures a distance to the object to be measured 10 using a second point in time corresponding to a peak in the digital detection signal before the integration, the time range of which is limited.

Since the peak position is calculated on the basis of the integrated digital detection signal in this way, it is possible to reduce the influence of noise and more accurately calculate the peak position. Subsequently, on the basis of the peak position, the time range is limited and a peak position is calculated again from the digital detection signal before the integration. Therefore, the temporal resolution increases and extraction accuracy of a peak is improved. In this case, since the time range is limited, the influence of noise is reduced. As it is seen from this, it is possible to reduce the influence of noise and improve the extraction accuracy.

Figure 20:
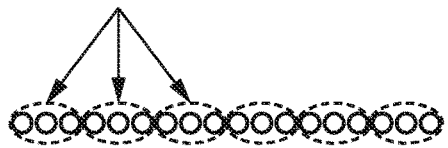
FIG. 20 is a diagram showing a pattern for adding up a plurality of outputs in a plurality of light receiving elements disposed side by side in the horizontal direction.

The time-division integration circuitry 318 in this embodiment is configured to be capable of adding up a plurality of times of outputs of the light receiving element 314. FIG. 20 is a diagram showing a pattern in which light pulse is emitted a plurality of times while being scanned in the horizontal direction, scattered light of the light pulse is received a plurality of times by the light receiving element 314, and a plurality of obtained outputs are added up. Consequently, random noise is further reduced.

Figure 21:
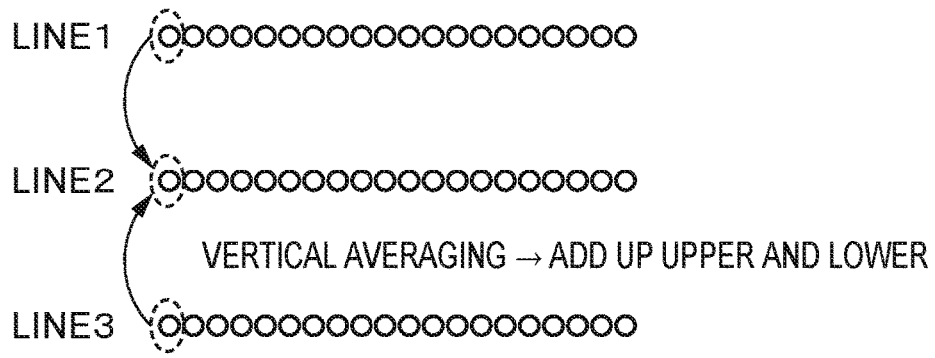
FIG. 21 is a diagram showing a pattern for adding up a plurality of outputs of the plurality of light receiving elements 314 disposed side by side in the vertical direction.

FIG. 21 is a diagram showing a pattern for adding up a plurality of outputs of the plurality of light receiving elements 314 disposed side by side in the vertical direction. In this case, the time-division integration circuitry 318 also adds up the plurality of outputs of the plurality of light receiving elements 314. Consequently, the random noise is further reduced.

In this way, in this embodiment, the light pulse is emitted a plurality of times while being scanned in the horizontal direction. The time-division integration circuitry 318 is configured to be capable of adding up the outputs of the light pulse. Further, the time-division integration circuitry 318 is configured to be capable of adding up the plurality of outputs in the vertical direction. That is, the time-division integration circuitry 318 is capable of simultaneously performing spatial averaging by accessing the buffers 352 corresponding to the other plurality of light receiving elements 314 and integrating data of the buffers 352.

Figure 22:
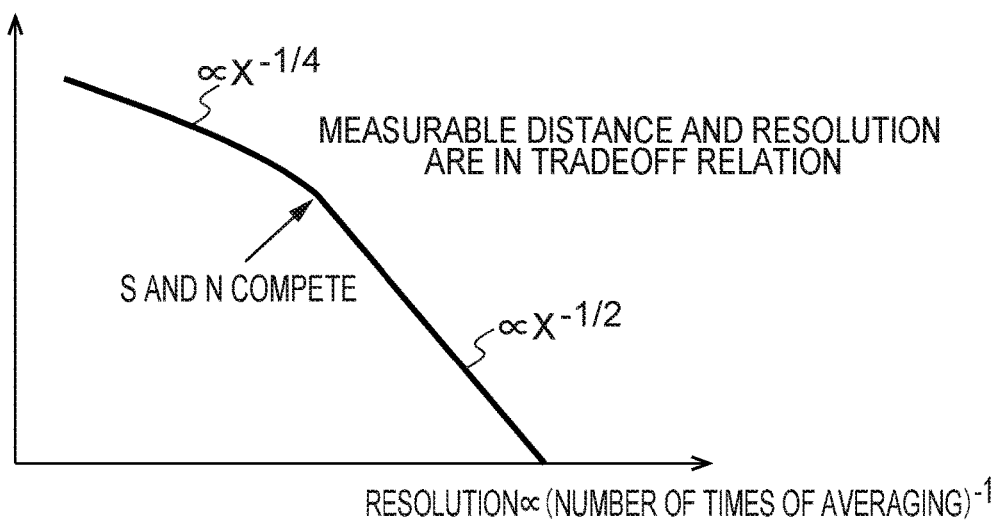
FIG. 22 is a diagram showing a relation between the number of additions of the plurality of light receiving elements and a measurable distance.

FIG. 22 is a diagram showing a relation between the number of additions of the plurality of light receiving elements 314 and a measurable distance. The horizontal axis indicates the number of additions, that is, resolution of the plurality of light receiving elements 314. The vertical axis indicates a measurable distance. In this case, when the resolution increases, a value on the horizontal axis moves close to the origin. When the resolution decreases, the value on the horizontal axis moves always from the origin.

In this way, when the number of additions of the plurality of light receiving elements 314 is increased, the resolution decreases but the measurable distance increases. Therefore, the increase in the measurable distance and the increase in the resolution are in a tradeoff relation.

As explained above, like the measurement processing circuitry 320 according to the first embodiment, the measurement processing circuitry 320 in this embodiment performs the first-time of processing, for example, performs the interpolation processing on the integrated digital detection signal after being time-division integrated shown in the upper figure in FIG. 19. When signals based on a plurality of outputs of the plurality of light receiving elements 314 in the horizontal direction or the vertical direction are added up, the signals based on the outputs of the plurality of light receiving elements 314 are added up as shown in FIGS. 20 and 21. In this case, the influence of noise is further reduced. It is possible to more highly accurately detect a peak position.

The measurement processing circuitry 320 detects a peak position again from time-series data before integration. In this case, time-series data in time ranges before and after the peak position calculated in the first-time of processing is used. In this case, the detection is performed before signals are added up on the basis of the plurality of outputs of the plurality of light receiving elements 314. Therefore, spatial integration is not performed either. A signal based on a single light receiving element 314 is used. Consequently, the spatial resolution increases and the measurable distance can be increased.

In this way, the peak position is calculated on the basis of the integrated digital detection signal after being time-division integrated. Therefore, it is possible to reduce the influence of noise and more accurately calculate a peak position. On the basis of the peak position, the time range is limited and a peak is calculated from time-series data before integration. Therefore, the temporal resolution and the spatial resolution further increase and extraction accuracy of a peak is improved. As it is seen from the above, it is possible to reduce the influence of noise and increase the measurable distance.

Note that, in this embodiment, it is possible to simultaneously calculate distance data of the plurality of light receiving elements 314 around a detection target element. By comparing measured distances in the plurality of light receiving elements 314 around the measurement target element and a measured distance of the detection target element, it is possible to determine whether a boundary of a measurement target is present between the measurement target element and peripheral pixels. When the boundary is present, it is possible to estimate a position of the boundary.

Further, it is possible to estimate a tilt of a surface of the measurement target. When it is estimated that the surface expands and does not tilt, an average of the measured distances in the plurality of light receiving elements 314 may be replaced with the measured distance of the detection target element. In this case, reliability is high. It is possible to obtain a result with less fluctuation.

Figure 23:
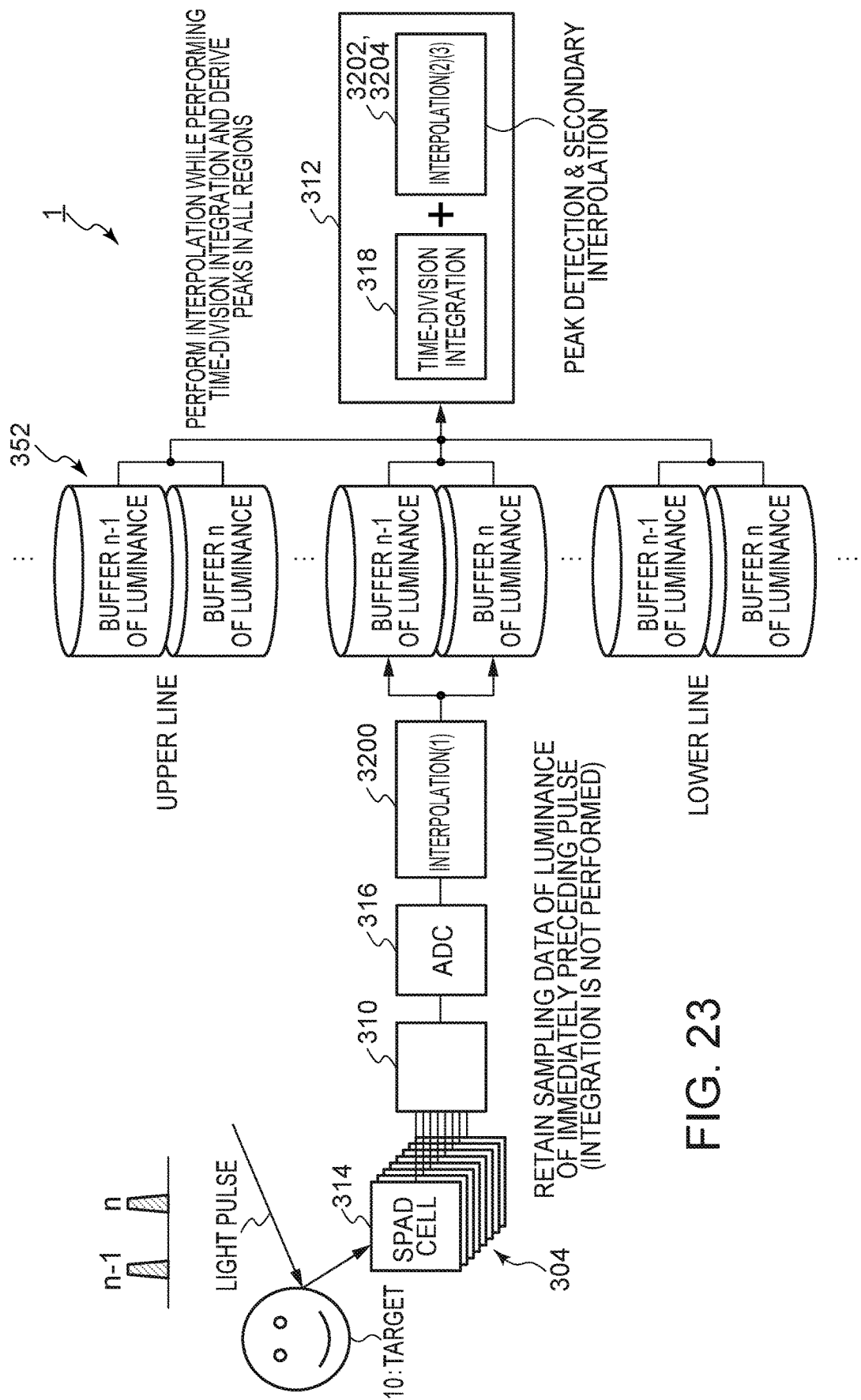
FIG. 23 is a configuration example of the distance measuring device that performs processing in measurement processing circuitry before buffer saving.

FIG. 23 is a configuration example of the distance measuring device 1 that performs processing in the first interpolation processing circuitry 3200 before buffer saving. As shown in FIG. 23, the configuration example is different from the configuration example of the distance measuring device 1 shown in FIG. 18 in that the processing in the first interpolation processing circuitry 3200 is performed before the buffer saving. As explained above, it is also possible to perform the processing in the FIR filter in the processing in the first interpolation processing circuitry 3200 immediately before the time-division integration by the time-division integration circuitry 318 because of linearity of the FIR filter.

As explained above, with the distance measuring device 1 according to this embodiment, on the basis of the first point in time corresponding to the peak in the integrated digital detection signal, the time range in the digital detection signal before the integration is limited. A peak is detected again from the digital detection signal in the limited range. Consequently, it is possible to suppress the influence of the environmental light using the integrated digital detection value. It is possible to maintain the temporal resolution and the spatial resolution of the distance measurement by using the digital detection signal before the integration.

Fourth Embodiment

In a fourth embodiment, after an output of time to digital conversion circuitry is time-integrated to calculate a peak, a position of a peak is calculated again from time-series data before being time-integrated, a range of which is limited, on the basis of the peak to improve measurement accuracy. Differences from the second embodiment are explained below.

Figure 24:
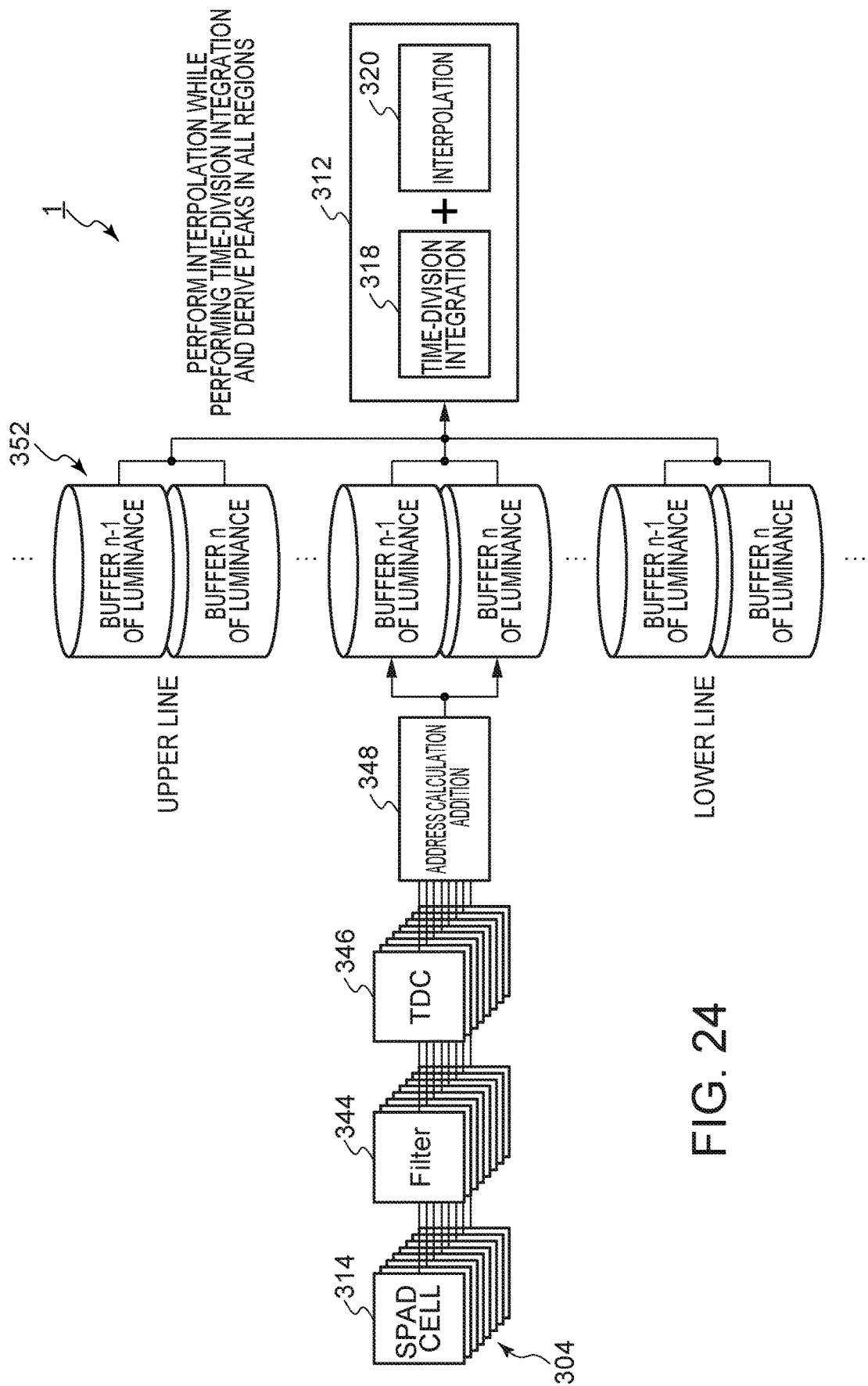
FIG. 24 is a diagram showing a schematic configuration of a distance measuring device according to a fourth embodiment.

The configuration of the distance measuring device 1 according to the fourth embodiment is explained with reference to FIG. 24. FIG. 24 is a diagram showing a schematic configuration of the distance measuring device 1 according to the fourth embodiment. As shown in FIG. 24, the distance measuring device 1 according to the fourth embodiment is different from the distance measuring device 1 shown in FIG. 14 in that the distance measuring device 1 according to the fourth embodiment includes a plurality of buffers 352 for each of the plurality of light receiving elements 314. Components same as the components shown in FIG. 14 are denoted by the same reference numerals and explanation of the components is omitted.

The plurality of buffers 352 are capable of retaining data before being time-division integrated. That is, it is possible to save values of detection signals based on outputs of each of the plurality of light receiving elements 314 for a plurality of time periods. It is possible to perform the time-division integration after storage in the buffers.

The time-division integration circuitry 318 in this embodiment is configured to be capable of adding up a plurality of outputs in the horizontal direction or the vertical direction. Alternatively, the time-division integration circuitry 318 may add up pluralities of outputs in the horizontal direction and the vertical direction. That is, in the time-division integration, it is possible to simultaneously perform spatial averaging by accessing buffers corresponding to pluralities of light receiving elements 314 in the horizontal direction and the vertical direction and integrating data of the buffers.

Like the measurement processing circuitry 320 according to the second embodiment, the measurement processing circuitry 320 performs first-time processing and performs interpolation processing on time-division integrated time-series data. That is, the measurement processing circuitry 320 detects a peak position on the basis of the time-division integrated time-series data.

Subsequently, the measurement processing circuitry 320 detects a peak position again from time series data before integration. In this case, time series data in time ranges before and after the peak position calculated in the first-time processing is used.

In this way, the peak position is calculated on the basis of the time-division integrated time-series data. Therefore, it is possible to reduce the influence of noise and more accurately calculate the peak position. Subsequently, on the basis of the peak position, the time range is limited and a peak is calculated from the time series data before integration. Therefore, temporal resolution increases and extraction accuracy of the peak is improved. In this case, since the time range is limited, it is possible to reduce the influence of noise. As it is seen from this, it is possible to reduce the influence of noise and improve the extraction accuracy.

In the time-division integration, when a plurality of outputs of the plurality of light receiving elements 314 in the horizontal direction or the vertical direction are added up, the influence of noise is further reduced and the peak position is more highly accurately detected. In this case, the detection is performed before the outputs of the plurality of light receiving elements 314 are added up. Therefore, spatial integration is not performed either. A single output of the light receiving element 314 is used. Consequently, as shown in FIG. 21, the spatial resolution increases and the measurable distance can be increased. Note that, in the measurement processing circuitry 320 shown in FIG. 24, according to linearity of an FIR filter, the processing in the first interpolation processing circuitry 3200 may be performed immediately after the processing in the time to digital conversion circuitry 346.

As explained above, with the distance measuring device 1 according to this embodiment, the time range is limited on the basis of the peak position calculated on the basis of the time-division integrated time-series data. A peak is calculated again from the time series data before integration. Consequently, it is possible to detect a peak position in a state in which temporal resolution and spatial resolution are maintained while reducing the influence of environmental noise. Consequently, it is possible to increase the spatial resolution and increase the measurable distance.

Fifth Embodiment

The distance measuring device 1 according to a fifth embodiment is different from the distance measuring device 1 according to the third embodiment in that the measurement processing circuitry 320 has a function of verifying a peak position. Differences from the distance measuring device 1 according to the third embodiment are explained.

The components of the distance measuring device 1 according to the fifth embodiment are equivalent to the components shown in FIG. 18 or 23. Therefore, explanation of the components is omitted.

As explained above, the measurement processing circuitry 320 (FIGS. 18 and 23) performs the first-time processing, for example, performs the interpolation processing on the integrated digital detection signal shown in the upper figure in FIG. 19. That is, the measurement processing circuitry 320 detects a position of a peak on the basis of the integrated digital detection signal. When a plurality of SPAD cell outputs in the horizontal direction or the vertical direction are added up, a plurality of outputs of the plurality of light receiving elements 314 are added up as shown in FIGS. 20 and 21.

Subsequently, for example, the measurement processing circuitry 320 (FIGS. 18 and 23) detects a position of a peak again from the time-series data before integration shown in the lower figure in FIG. 19. In this case, the measurement processing circuitry 320 uses time-series data in time ranges before and after the peak position calculated in the first-time processing.

Subsequently, the measurement processing circuitry 320 calculates, as reliability, a ratio of the magnitude of the peak calculated second and the magnitude of the peak calculated first. When the ratio, which is the reliability, is equal to or larger than a threshold, the measurement processing circuitry 320 adopts, as a measured distance, the position of the peak calculated second. When the ratio is smaller than the threshold, the measurement processing circuitry 320 discards the position of the peak.

The measurement processing circuitry 320 determines, on the basis of correlation values of the integrated digital detection signal after being time-division integrated and the digital direction signal before the integration, whether the position of the peak calculated second is adopted. That is, the measurement processing circuitry 320 calculates a cross-correlation value as reliability. When the reliability is equal to or larger than the threshold, the measurement processing circuitry 320 adopts, as the measured distance, the position of the peak calculated second. When the reliability is smaller than the threshold, the measurement processing circuitry 320 discards the position of the peak.

FIGS. 25A to 25C are diagrams showing an example of cross-correlation. FIG. 25A shows an integrated digital detection signal. FIG. 25B is a digital detection signal before being time-division integrated. FIG. 25C shows a correlation value. The horizontal axis indicates sampling timing. As shown in FIG. 25, when the cross-correlation value is equal to or larger than the threshold, the measurement processing circuitry 320 adopts, as the measured distance, the position of the peak calculated second. When the cross-correlation value is smaller than the threshold, the measurement processing circuitry 320 discards the position of the peak.

Note that, when the output value is adopted, the output value is output as position data of the peak in some case. In other cases, both of the position data of the peak and the reliability are output and it is determined in a later stage whether the position data of the peak and the reliability are adopted as data. In this case, a measurement result with low reliability can be discarded on the basis of information corresponding to the reliability of the data.

As explained above, with the distance measuring device 1 according to this embodiment, the measurement processing circuitry 320 calculates the reliability of the measurement result. Consequently, it is possible to discard a measurement result with low reliability.

Sixth Embodiment

The distance measuring device 1 according to a sixth embodiment is different from the distance measuring device 1 according to the first embodiment in that the distance measuring device 1 according to the sixth embodiment stores time-division integrated values respectively corresponding to a plurality of time periods. Differences are mainly explained bellow.

Figure 26:
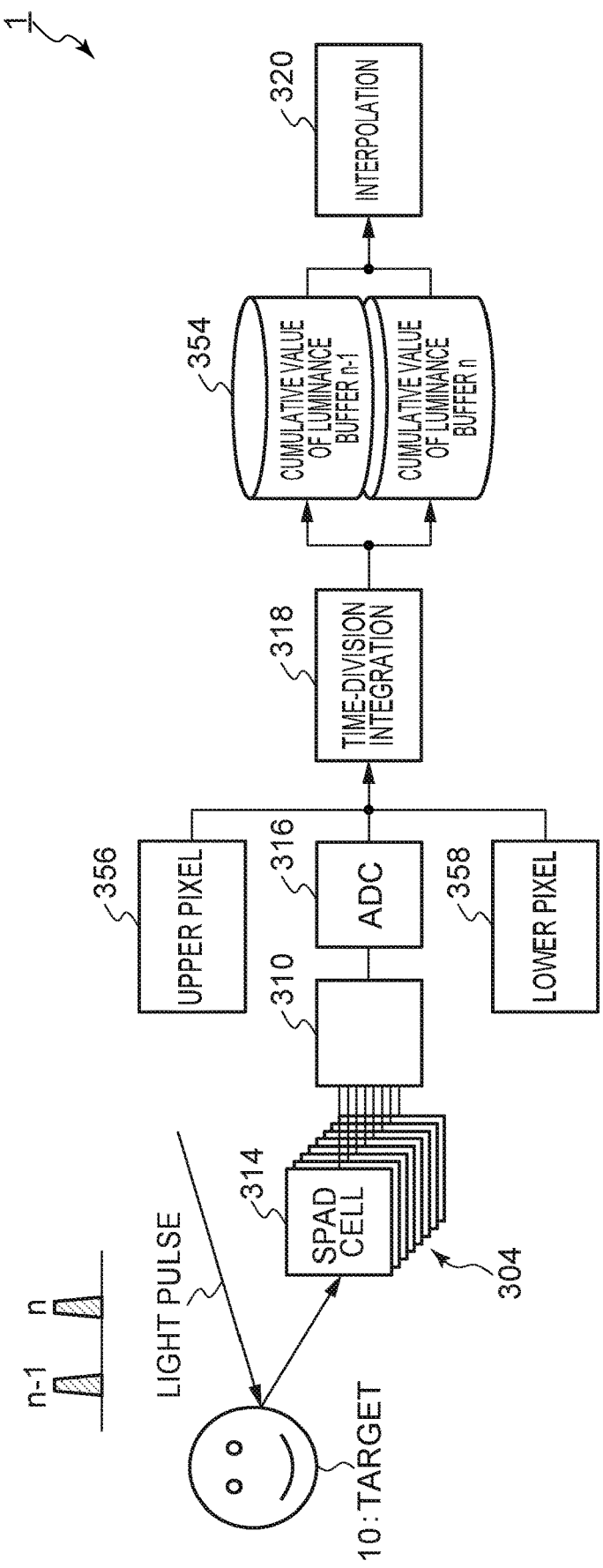
FIG. 26 is a diagram showing a schematic configuration of a distance measuring device according to a sixth embodiment.

The configuration of the distance measuring device 1 according to the sixth embodiment is explained with reference to FIG. 26. FIG. 26 is a diagram showing a schematic configuration of the distance measuring device 1 according to the sixth embodiment. As shown in FIG. 26, the distance measuring device 1 according to the sixth embodiment is different from the distance measuring device 1 shown in FIG. 4 in that the distance measuring device 1 according to the sixth embodiment includes a plurality of buffers 354 behind the time-division integration circuitry 318. Equivalent components are denoted by the same reference numerals and explanation of the components is omitted.

The plurality of buffers 354 are capable of retaining time-division integration results at a plurality of points in time. The time-division integration circuitry 318 in this embodiment is configured to be capable of adding up signals based on outputs of the plurality of light receiving elements 314 in the horizontal direction or the vertical direction. That is, the time-division integration circuitry 318 may add up a signal based on an output of a light receiving element (an upper pixel) 356 on the vertical upper side and a signal based on an output of a light receiving element (a lower pixel) 358 on the vertical lower side.

Figure 27:
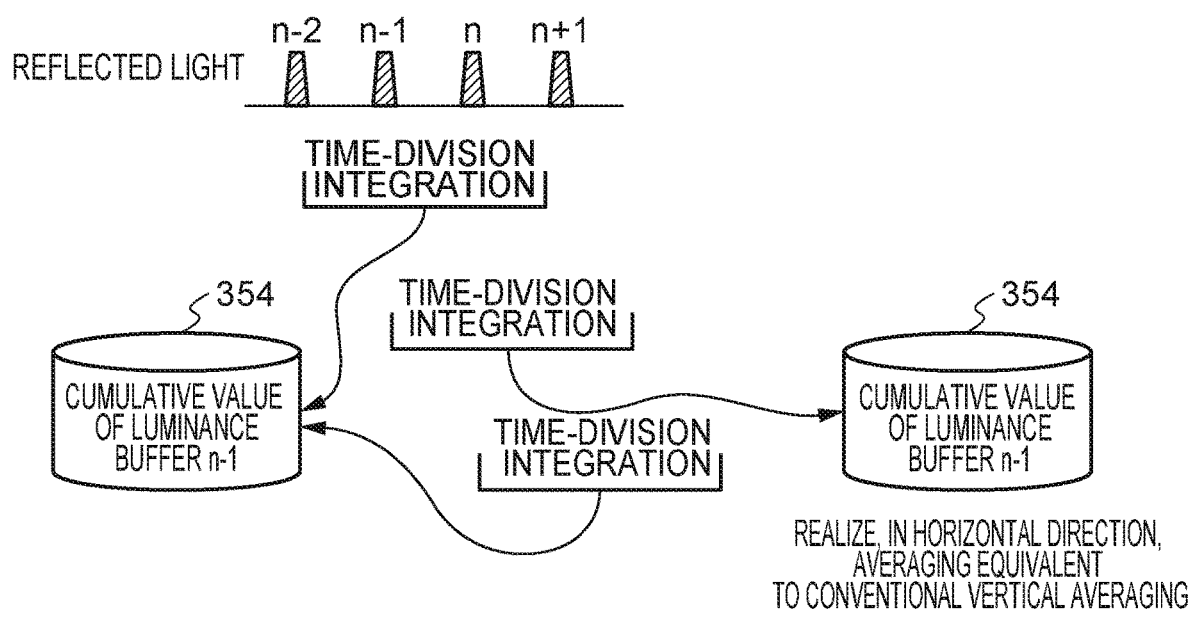
FIG. 27 is a diagram showing an example of time-division integrated values saved in a plurality of buffers.

FIG. 27 is a diagram showing an example of time-division integrated values saved in the plurality of buffers 354. As shown in FIG. 27, in a buffer n−1, outputs of the plurality of light receiving elements 314 corresponding to reflected lights n−2, n−1, and n are accumulated. In a buffer n, outputs of the plurality of light receiving elements 314 corresponding to reflected lights n−1, n, and n+1 are accumulated.

The measurement processing circuitry 320 detects positions of peaks from time-series data saved in the respective buffers n−1 and n. Consequently, the measurement processing circuitry 320 can detect a plurality of peak positions at different points in time from one light receiving element 314.

As explained above, with the distance measuring device 1 according to this embodiment, the plurality of buffers 354 retain the time-division integration results at the plurality of points in time. Consequently, reliability of a measurement result is calculated. Therefore, it is possible to detect a plurality of peak positions at different points in time from one light receiving element 314.

Seventh Embodiment

The distance measuring device 1 according to a seventh embodiment is different from the distance measuring device 1 according to the first or third embodiment in that integration gates are provided for output values of the SPAD cells 314. Differences from the distance measuring device 1 according to the first or third embodiment are explained below.

Figure 28:
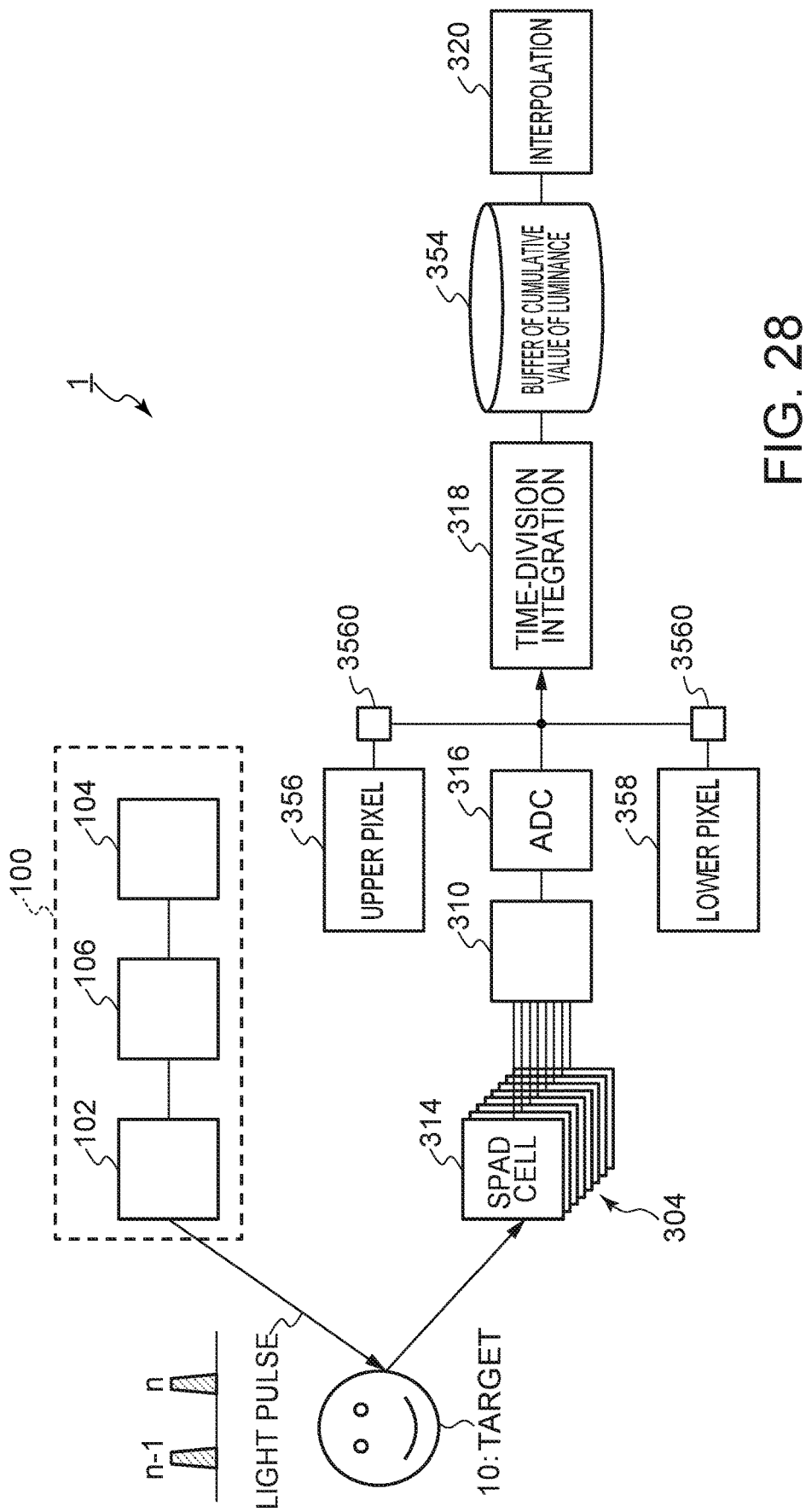
FIG. 28 is a schematic diagram showing a distance measuring device according to a seventh embodiment.

FIG. 28 is a diagram showing a schematic configuration of the distance measuring device 1 according to the seventh embodiment. As shown in FIG. 28, the distance measuring device 1 according to the seventh embodiment is different from the distance measuring device 1 shown in FIG. 4 in that the distance measuring device 1 according to the seventh embodiment includes integration gates 3560. Equivalent components are denoted by the same reference numerals and explanation of the components is omitted.

When an integrated value within a predetermined time period of a digital detection signal exceeds a predetermined value, the integration gates 3560 reduce a digital detection signal of the light receiving element 314, the integrated value of which exceeds the predetermined value, and use the digital detection signal for addition in the time-division integration circuitry 318. The reduction includes interruption.

Figure 29:
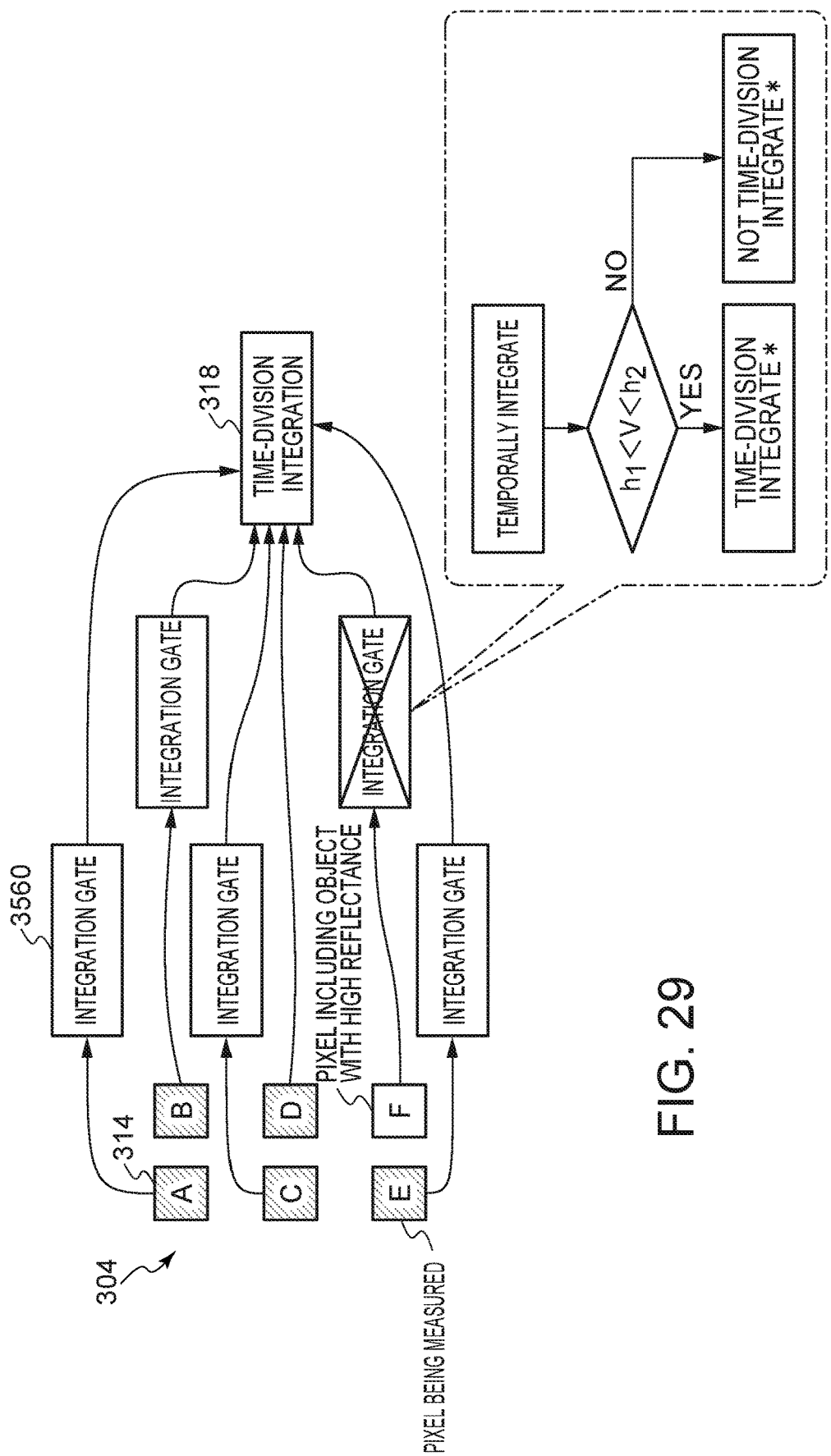
FIG. 29 is a schematic diagram for explaining the configuration of an integration gate.

FIG. 29 is a schematic diagram for explaining the configuration of the integration gates 3560. As shown in FIG. 29, the integration gates 3560 temporally integrate outputs of the light receiving elements 314 after digital conversion. If an integrated value V is within a predetermined range, the integration gates 3560 cause the time-division integration circuitry 318 to allow an output of the AD conversion circuitry 316 to pass. Otherwise, the integration gates 3560 interrupt the outputs and do not cause the time-division integration circuitry 318 to allow the output to pass. That is, if an integrated value of signals based on the outputs of the light receiving elements 314 within a predetermined time is within a range of a predetermined value, the integration gates 3560 causes the time-division integration circuitry 318 to use the outputs of the light receiving elements 314 in processing in the time-division integration circuitry 318.

Figure 30:
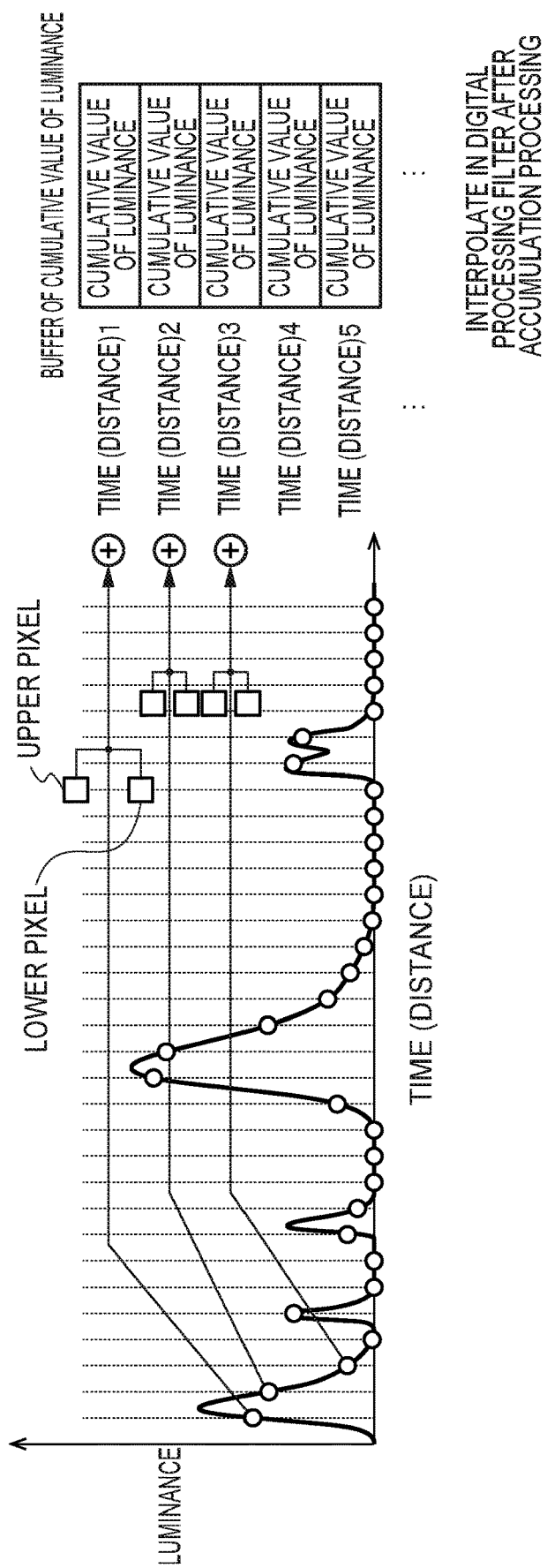
FIG. 30 is a diagram schematically showing a relation between the integration gate and a buffer.

FIG. 30 is a diagram schematically showing a relation between the integration gate 3560 and the buffers 354. The horizontal axis indicates sampling timing and the vertical axis indicates a luminance value (a value of a digital detection signal) saved in the buffer 354 of a cumulative value of luminance. As shown in FIG. 30, signals based on outputs of the upper and lower light receiving elements 314 are accumulated and stored in the buffer as a cumulative value of luminance.

The action of the integration gate 3560 is explained with reference to FIGS. 31 and 32. FIG. 31 is a diagram schematically showing the reflectance of a measurement target object that reflects photons returning to the light receiving elements 314 (pixels). In FIG. 31, the reflectance of a measurement target region being measured by the light receiving element F is higher than the reflectance of the other regions.

FIGS. 32A to 32C are diagrams schematically showing integrated outputs of the light receiving elements D and F. FIGS. 32A and 32B respectively show values of signals based on outputs of the light receiving elements D and F. FIG. 32C shows a time-division integrated value of signals based on outputs of the light receiving elements A to F. The signals based on the outputs of the light receiving elements A to F are integrated as an output signal of the light receiving element D. The horizontal axis indicates time and the vertical axis indicates a value (a luminance value) of a digital detection signal.

As shown in FIG. 32, in a digital detection signal value of the light receiving element F that is measuring a photon returning from the region having the high reflectance, a value of noise is large. When the digital detection signal value is used for calculation of an integrated value of the light receiving element D, a detection accuracy of a peak position is deteriorated. Therefore, the integration gates 3560 of the light receiving element F acts not to use the digital detection signal based on the output of the light receiving element F for the calculation of the integrated value of the light receiving element D.

Figure 33A:
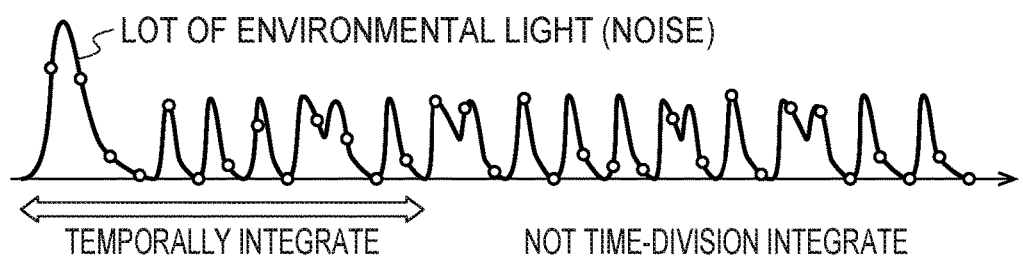
FIGS. 33A and 33B are diagrams showing a state in which the influence of noise is reduced in an integrated value of the light receiving element D.
Figure 33B:
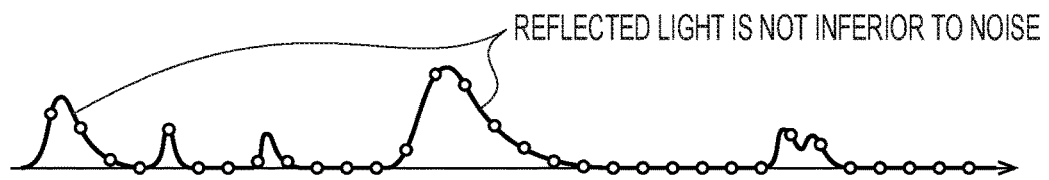

FIGS. 33A and 33B are diagrams showing a state in which the influence of noise is reduced in the integrated value of the light receiving element D. FIGS. 33A and 33B respectively show a digital detection signal value based on an output value of the light receiving element F and an integrated digital detection signal value of the light receiving elements A to F. The horizontal axis indicates time and the vertical axis indicates a luminance value. As shown in FIG. 33, the output of the light receiving element F is not used for calculation of the integrated value of the light receiving element D. Therefore, the influence of noise is reduced in the integrated value of the light receiving element D.

As explained above, the distance measuring device 1 according to this embodiment includes the integration gates 3560 corresponding to the light receiving elements A to F. Consequently, when signals based on output signals of a plurality of light receiving elements are added up, it is possible to reduce signals based on regions having different reflection characteristics. Therefore, it is possible to detect feeble scattered light. It is possible to further increase measurement accuracy.

Eighth Embodiment

The distance measuring device 1 according to an eighth embodiment is different from the distance measuring device 1 according to the third or fourth embodiment in that integration gates 360 are provided for output values of the buffer 352 of luminance. Differences are explained below.

Figure 34:
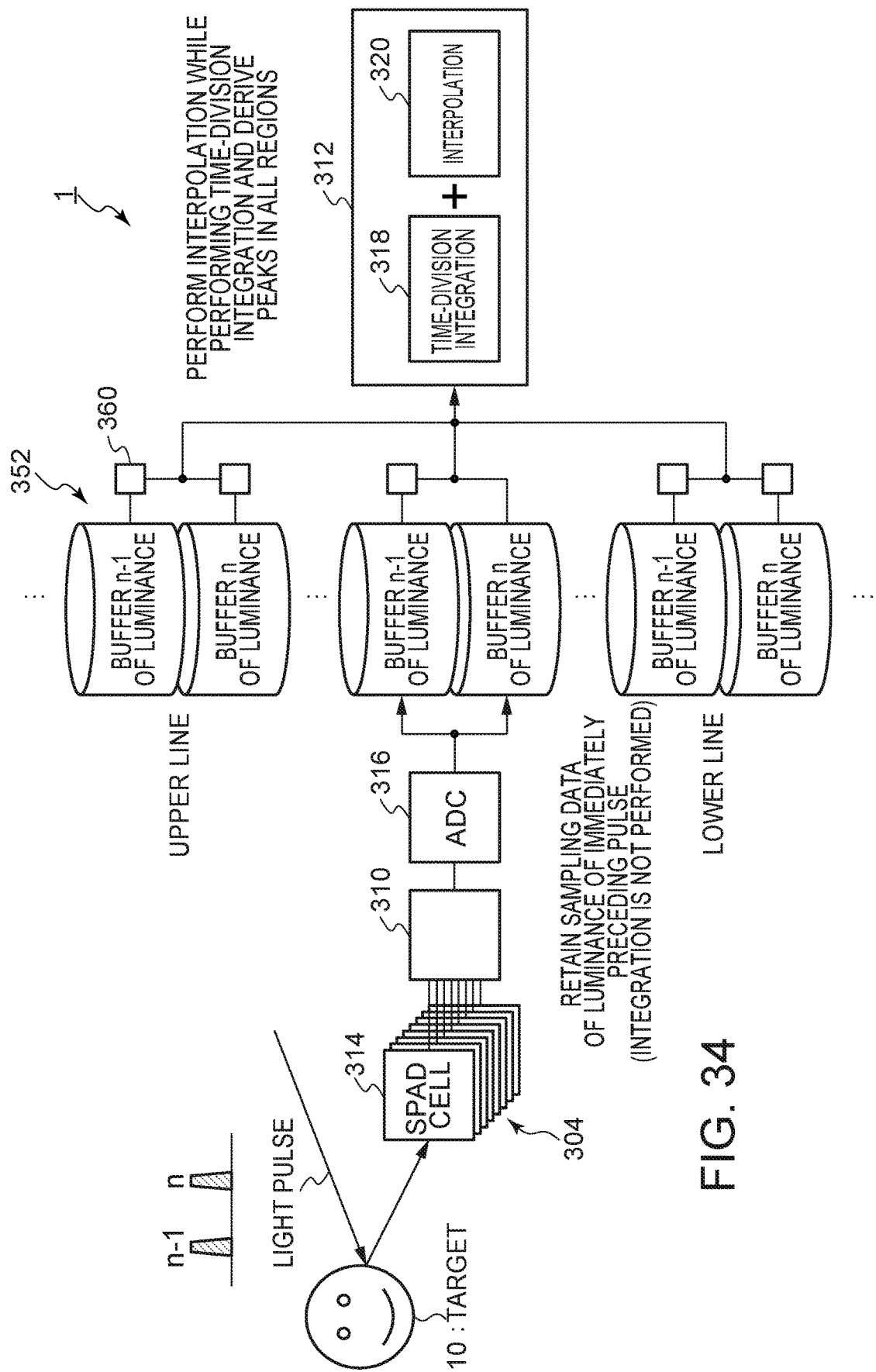
FIG. 34 is a diagram showing a schematic configuration of a distance measuring device according to an eighth embodiment.

FIG. 34 is a diagram showing a schematic configuration of the distance measuring device 1 according to the eighth embodiment. As shown in FIG. 34, the distance measuring device 1 according to the eighth embodiment is different from the distance measuring device 1 shown in FIG. 18 in that the distance measuring device 1 according to the eighth embodiment includes the integration gates 360. Equivalent components are denoted by the same reference numerals and explanation of the components is omitted.

When an integrated value within a predetermined time period of a digital detection signal exceeds a predetermined value, the integration gates 360 reduces the digital detection signal of the light receiving element 314, the integrated value of which exceeds the predetermined value, and uses the digital detection value for addition in the time-division integration circuitry 318. The reduction includes interruption.

Consequently, when environmental light from an object having high reflectance is made incident on the light receiving elements (pixels) 314, which are targets of averaging, it is possible prevent a signal based on an output signal of the light receiving element 314 from being used for integration.

As explained above, with the distance measuring device 1 according to this embodiment, the integration gates 360 are provided for the output values of the buffers 532 of luminance. Consequently, when the environmental light from the object having the high reflectance is made incident on the light receiving elements 314, which are the targets of averaging, it is possible to prevent output signals of the light receiving elements 314 from being integrated. Therefore, it is possible to prevent reflected light from being lost in the environmental light. It is possible to improve measurement accuracy.

Ninth Embodiment

The distance measuring device 1 according to a ninth embodiment is different from the distance measuring device 1 according to the first embodiment in that both of the AD conversion circuitry 316 and the time to digital conversion circuitry 346 are used. In the following explanation, differences from the first embodiment are explained. Components equivalent to the components in the first embodiment are denoted by the same reference numerals and explanation of the components is omitted.

Figure 35:
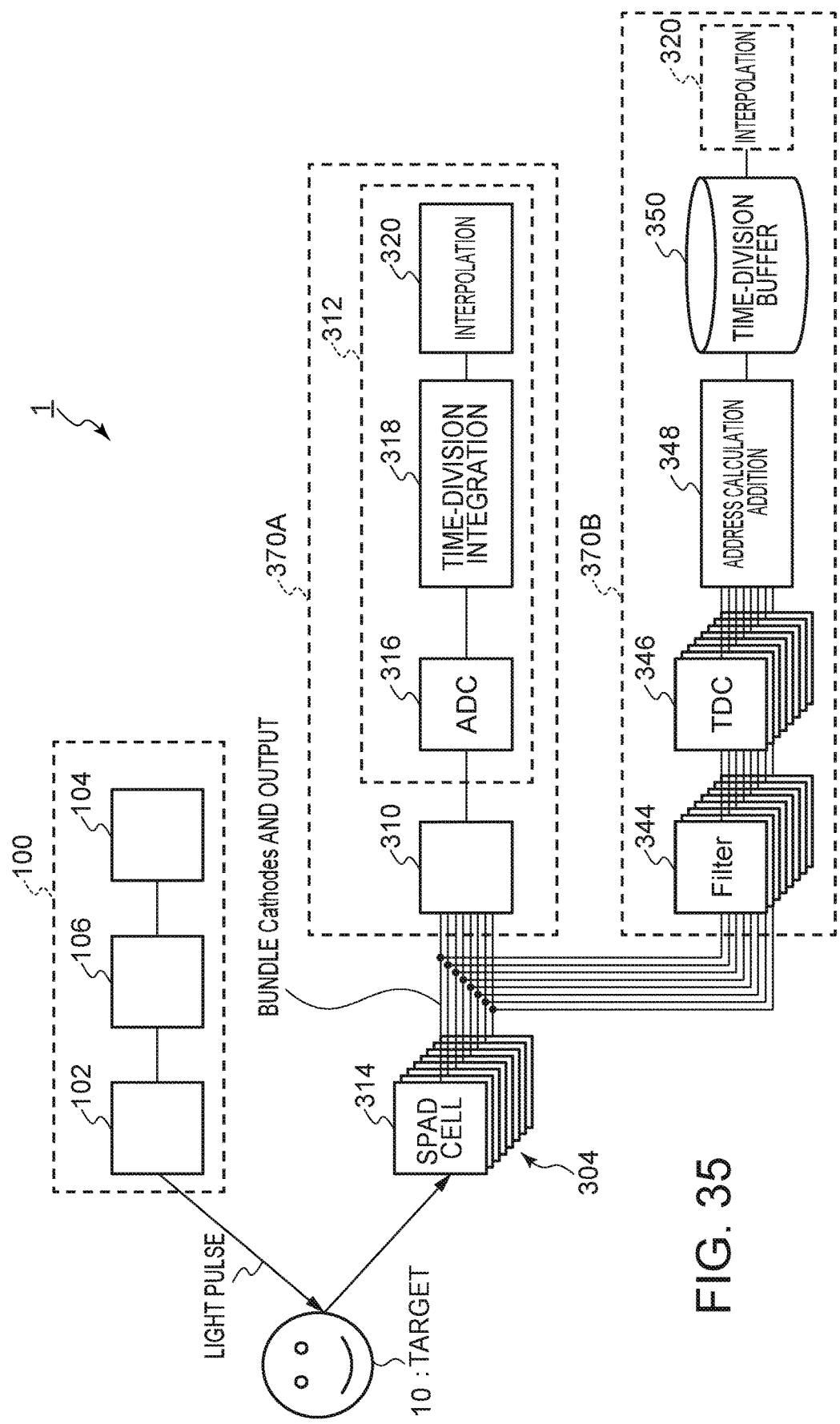
FIG. 35 is a schematic diagram showing the configuration of a distance measuring device according to a ninth embodiment.

FIG. 35 is a schematic diagram showing the configuration of the distance measuring device 1 according to the ninth embodiment. The distance measuring device 1 according to the ninth embodiment is different from the distance measuring device 1 according to the first embodiment in that outputs from the light receiving elements 314 are connected to first distance measurement circuitry 370A and second distance measurement circuitry 370B as shown in FIG. 35. Components equivalent to the components of the distance measuring device 1 shown in FIG. 4 or the distance measuring device 1 shown in FIG. 14 are denoted by the same reference numerals and explanation of the components is omitted. As shown in FIG. 35, the measurement circuitry 300 includes the first distance measurement circuitry 370A and the second distance measurement circuitry 370B.

The first distance measurement circuitry 370A converts signals based on a detection signal of the photodetector 304 into digital detection signals and measures a distance to the object to be measured 10 on the basis of the digital detection signals. More specifically, the first distance measurement circuitry 370A converts the signals based on the detection signal of the photodetector 304 into digital detection signals, integrates sampling values of sampling timings respectively corresponding to the digital conversion signals, and measures the distance to the object to be measured on the basis of the integrated sampling value. That is, the first distance measurement circuitry 370A includes the analog circuitry section 310, the AD conversion circuitry 316, the time-division integration circuitry 318, and the measurement processing circuitry 320.

The second distance measurement circuitry 370B acquires, on the basis of the detection signal of the photodetector 304, a time difference between time when the light source 102 emits pulse light and time until scattered light of light scattered by the object to be measured 10 is detected by the photodetector 304. The second distance measurement circuitry 370B measures the distance to the object to be measured 10 using the time difference. That is, the second distance measurement circuitry 370B includes the filter 344, the time to digital conversion circuitry 346, the address calculation addition circuitry 348, the time-division buffer 350, and the measurement processing circuitry 320.

The photodetector 304 includes an optical element for far distance disposed in a position of conjugation of light made incident via the optical mechanism system 200 and an optical element for near distance deviating from the position of the conjugation.

The light source is explained with reference to FIGS. 35 and 36. FIG. 36 is a diagram schematically showing a time-series pulse of the light source. As shown in FIG. 36, the light source 102 radiates two or more kinds of pulse lights having different levels of energy. More specifically, the light source 102 alternately emits both of an intense light pulse and a weak light pulse. A pulse light is more intense as an emission time is longer.

The configuration of the photodetector 304 is explained with reference to FIGS. 35 and 37. FIG. 37 is a diagram schematically showing the configuration of the photodetector 304. As shown in FIG. 37, the photodetector 304 includes a light receiving element 3140 for near distance and a light receiving element 3142 for far distance. The light receiving elements 3140 and 3142 are, for example, SPADs.

The light receiving element 3142 for far distance is disposed in a position of conjugation of light made incident via the optical mechanism system 200. The light receiving element 3140 for near distance is disposed in a position deviating from the position of the conjugation of the light made incident via the optical mechanism system 200. The position of the conjugation of the light made incident via the optical mechanism system 200 means a position where light reflected from a measurement target at a longest distance in the specifications of the device is focused via the optical mechanism system 200.

An output of the light receiving element 3142 for far distance is input to the first distance measurement circuitry 370A. An output of the light receiving element 3140 for near distance is input to the second distance measurement circuitry 370B.

In this embodiment, measurement is performed via the fixed optical mechanism system 200. Therefore, reflected light from a near object and reflected light from a far object irradiate different places on a sensor surface in a strict sense. Therefore, the light receiving element for near distance is set in a place well irradiated by the reflected light from the near object. The light receiving element for far distance is set in a place well irradiated by the reflected light from the far object (such that the center of the reflected light from the object at the longest distance in the specifications substantially overlaps the center of the light receiving element 3142 for far distance). The optical mechanism system 200 for light reception is adjusted such that the reflected light from the object at the longest distance in the specifications of the device is focused on the sensor surface of the light receiving element.

FIG. 38 is a diagram showing a table showing intensities and measurement schemes of lights emitted by light sources used in measurement at a near distance, an intermediate distance, and a far distance or low reflectance. That is, in the distance measuring device 1 according to this embodiment, the intensity of pulse light (an LD pulse) is set to small for the near distance and the pulse light is processed by the second distance measurement circuitry 370B. The intensity of the pulse light is set to small for the intermediate distance and the pulse light is processed by the first distance measurement circuitry 370A. Further, for the far distance or the low reflectance, the intensity of the pulse light is set to large and the pulse light is processed by the first distance measurement circuitry 370A.

More specifically, first, the reflected light from the near object mainly irradiates the light receiving element for near distance. A distance to the near object is measured by the second distance measurement circuitry 370B. In general, the time to digital conversion circuitry 346 of the second distance measurement circuitry 370B has high time resolution and also has high distance resolution for distance measurement of a target at a near distance. On the other hand, a strong light pulse is emitted to capture more reflected light from the far object. The reflected light from the far object mainly irradiates the light receiving element for far distance and is sampled by the AD conversion circuitry 316 of the first distance measurement circuitry 370A. Note that, as explained in the first embodiment, the first distance measurement circuitry 370A has a response characteristic equal to or shorter than the pulse width of the pulse light. Therefore, it is possible to measure a far distance. Further, by using time-division integration, interpolation processing, and the like, it is possible to more highly accurately measure the far distance.

In reflected lights from an object at the near distance to the intermediate distance, defocus occurs on the sensor surface of the photodetector 304 and a formed image is blurred. As a result, a part of the reflected light from the object of the near distance to the intermediate distance irradiates the light receiving element 3142 for far distance as well. Therefore, the reflected light from the object at the near distance to the intermediate distance is processed by the first distance measurement circuitry 370A as well. Note that, since the reflected light weakens at the intermediate distance and the far distance, cell saturation in the light receiving element less easily occurs. The AD conversion circuitry 316 of the first distance measurement circuitry 370A is capable of always sampling reflected light from an intense light pulse and reflected light from a weak light pulse. Therefore, it is also possible to measure weak reflected light from an object having extremely low reflectance present at the near distance. In this case, cell saturation less easily occurs because of the low reflectance.

As it is seen from the above, it is possible to perform more highly accurate distance measurement with less cell saturation according to the distances such as the near distance, the intermediate distance, and the far distance and according to the reflectance of an object.

As explained above, with the distance measuring device 1 according to this embodiment, both of the AD conversion circuitry 316 and the time to digital conversion circuitry 346 are used. Consequently, it is possible to use the time to digital conversion circuitry 346 for the measurement light from the near distance. It is possible to use the AD conversion circuitry 316 for the measurement lights from the intermediate and far distances. Therefore, it is possible to improve measurement accuracy at the near distance to the far distance.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device comprising:
 emission circuitry configured to emit pulse light having a predetermined pulse width;
 an optical mechanism system configured to emit the pulse light emitted by the emission circuitry to an object to be measured and receive scattered light of the pulse light scattered by the object to be measured; and
 measurement circuitry configured to measure, via the optical mechanism system, a distance to the object to be measured using a detection signal based on light received from a start of the emission of the pulse light until a time period corresponding to the pulse width elapses, wherein
 the measurement circuitry includes:
 a photodetector configured to output an output signal corresponding to intensity of light received via the optical mechanism system;
 an analog circuitry section configured to amplify the output signal; and
 a digital circuitry section at least including AD conversion circuitry configured to convert the output signal amplified by the analog circuitry section into a digital detection signal, and
 the detection signal is based on the digital detection signal.

2. The distance measuring device according to claim 1, wherein
 the photodetector includes:
 a light receiving element configured to output an output signal corresponding to intensity of light received via the optical mechanism system; and
 a first switching element connected in series to the light receiving element and configured to interrupt the output of the light receiving element according to elapse of the time period from the start of the output of the output signal.

3. The distance measuring device according to claim 2, wherein the light receiving element is an avalanche photodiode.

4. The distance measuring device according to claim 1, wherein
 the measurement circuitry includes:
 a photodetector configured to output an output signal corresponding to intensity of light received via the optical mechanism system; and
 an analog circuitry section at least including a filter configured to interrupt the output signal having a frequency equal to or lower than a frequency corresponding to a point in time when the time period elapses from a start of an output of the output signal and amplification circuitry configured to amplify a signal output by the filter, and
 the detection signal is based on a signal output by the amplification circuitry.

5. The distance measuring device according to claim 1, wherein
 the measurement circuitry includes:
 a photodetector configured to output an output signal corresponding to intensity of light received via the optical mechanism system; and
 an analog circuitry section at least including amplification circuitry configured to amplify the output signal and gain change circuitry configured to reduce a gain of the amplification circuitry according to elapse of the time period from a start of the output of the output signal, and
 the detection signal is based on a signal output by the amplification circuitry.

6. The distance measuring device according to claim 1, wherein
 the measurement circuitry includes:
 a photodetector configured to output an output signal corresponding to intensity of light received via the optical mechanism system; and
 an analog circuitry section at least including amplification circuitry configured to amplify the output signal and a second switching element connected in series to the amplification circuitry and configured to interrupt an output of the amplification circuitry according to elapse of the time period from a start of the output of the output signal, and
 the detection signal is based on a signal output by the amplification circuitry.

7. The distance measuring device according to claim 1, wherein
 the emission circuitry intermittently emits the pulse light a plurality of times, and
 the measurement circuitry at least includes:

a photodetector configured to output an output signal corresponding to intensity of light received via the optical mechanism system;

AD conversion circuitry configured to sample, at a plurality of sampling timings, a signal corresponding to the output signal of the photodetector every time the pulse light is emitted and convert the signal into a digital detection signal;

time-division integration circuitry configured to integrate the digital detection signal at each sampling timing and output the digital detection signal as an integrated digital detection signal; and measurement processing circuitry configured to measure the distance to the object to be measured on the basis of a first point in time corresponding to a peak in the integrated digital detection signal.

8. The distance measuring device according to claim 7, wherein, when there are two peaks, a time interval of which is equal to or shorter than the pulse width, in the integrated digital detection signal, the measurement processing circuitry interpolates a waveform of one peak based on the two peaks to measure the distance to the object to be measured.

9. The distance measuring device according to claim 1, wherein the measurement circuitry includes:

a photodetector configured to output an output signal corresponding to intensity of light received via the optical mechanism system;

a second filter configured to shape the output signal into the detection signal in a time range corresponding to the pulse width;

time to digital conversion circuitry configured to obtain, on the basis of the detection signal, a time difference between time when the emission circuitry emits the pulse light and time until scattered light of light scattered by the object to be measured is detected by the photodetector; and measurement processing circuitry configured to measure the distance to the object to be measured on the basis of the time difference.

10. The distance measuring device according to claim 9, wherein the measurement circuitry further includes addition circuitry configured to calculate a number of appearances of the time difference output by the time to digital conversion circuitry, and the measurement processing circuitry measures the distance to the object to be measured on the basis of a position of a peak in the number of appearances in the each time difference obtained by the addition circuitry.

11. The distance measuring device according to claim 7, wherein the measurement processing circuitry measures the distance to the object to be measured using a second point in time corresponding to a peak in the digital detection signal before the integration, a time range of which is limited on the basis of the first point in time.

12. The distance measuring device according to claim 1, wherein the emission circuitry intermittently emits the pulse light a plurality of times, and the measurement circuitry at least includes:

a photodetector including a two-dimensionally arranged plurality of light receiving elements;

AD conversion circuitry configured to sample, at a plurality of sampling timings, signals corresponding to output signals of the respective plurality of light emitting elements every time the pulse light is emitted and convert the signals into respective digital detection signals;

time-division integration circuitry configured to output, as an integrated digital detection signal, an integrated value obtained by integrating each of the digital detection signals at each of the sampling timings; and measurement processing circuitry configured to measure, on the basis of a first point in time corresponding to a peak in the integrated digital detection signal, the distance to the object to be measured using a second point in time corresponding to a peak in the digital detection signal before the integration, a time range of which is limited.

13. The distance measuring device according to claim 12, wherein the AD conversion circuitry converts the respective detection signals of the light receiving elements arranged within a predetermined range from the light receiving element in a measurement center among the plurality of light receiving elements into the respective digital detection signals, and the time-division integration circuitry integrates the digital detection signal of the light receiving element in the measurement center and the respective digital detection signals and outputs the digital detection signals as the integrated digital detection signal.

14. The distance measuring device according to claim 13, wherein, when an integrated value within a predetermined time of the digital detection signal of the light receiving element among the light receiving elements arranged within the predetermined range exceeds a predetermined value, the time-division integration circuitry reduces or interrupts the digital detection signal of the light receiving element, the integrated value of which exceeds the predetermined value.

15. A distance measuring device comprising:

emission circuitry configured to intermittently emit pulse light a plurality of times;

an optical mechanism system configured to emit the pulse light emitted by the emission circuitry to an object to be measured and receive scattered light of the pulse light scattered by the object to be measured;

a photodetector configured to output an output signal corresponding to intensity of light received via the optical mechanism system;

AD conversion circuitry configured to sample, at a plurality of sampling timings, a signal corresponding to the output signal of the photodetector every time the pulse light is emitted and convert the signal into a digital detection signal;

time-division integration circuitry configured to output, as an integrated digital detection signal, an integrated value obtained by integrating the digital detection signal at each of the sampling timings; and measurement processing circuitry configured to measure, on the basis of a first point in time of a peak in the integrated digital detection signal, the distance to the object to be measured using a second point in time of a peak in the digital detection signal, a time range of which is limited.

16. A distance measuring device comprising:

a light source configured to intermittently emit pulse light;

an optical mechanism system configured to emit light from the light source to an object to be measured and receive scattered light returning from a predetermined direction in scattered light of the light scattered by the object to be measured;

a photodetector configured to output a detection signal having magnitude corresponding to intensity of light made incident via the optical mechanism system;

first distance measurement circuitry configured to convert signals based on the detection signal into digital detection signals, integrate sampling values at sampling timings corresponding to the respective digital detection signals, and measure a distance to the object to be measured on the basis of the integrated sampling values; and second distance measurement circuitry configured to acquire, on the basis of the detection signal, a time difference between time when the light source emits the pulse light and time until the scattered light of the light scattered by the object to be measured is detected by the photodetector, and measure the distance to the object to be measured on the basis of the time difference.

17. The distance measuring device according to claim 16, wherein the photodetector includes an optical element for far distance disposed in a position of conjugation of light made incident via the optical mechanism system and an optical element for near distance disposed in a position deviating from the position of the conjugation.

18. The distance measuring device according to claim 17, wherein an output of the optical element for far distance is input to the first distance measurement circuitry and an output of the optical element for near distance is input to the second distance measurement circuitry.

19. The distance measuring device according to claim 18, wherein the light source radiates two or more kinds of pulses having different levels of energy.

* * * * *